US012711523B2

(12) United States Patent
Sueda

(10) Patent No.: US 12,711,523 B2
(45) Date of Patent: Aug. 18, 2026

(54) SYSTEMS AND METHODS FOR FACILITATING SHOPPING IN THE METAVERSE

(71) Applicant: Universal Electronics Inc., Scottsdale, AZ (US)

(72) Inventor: Masakazu Sueda, Kawasaki (JP)

(73) Assignee: Universal Electronics Inc., Scottsdale, AZ (US)

( * ) Notice: Subject to any disclaimer, the term of this patent is extended or adjusted under 35 U.S.C. 154(b) by 0 days.

(21) Appl. No.: 19/001,106

(22) Filed: Dec. 24, 2024

(65) Prior Publication Data

US 2025/0139662 A1 May 1, 2025

Related U.S. Application Data

(63) Continuation-in-part of application No. 18/483,262, filed on Oct. 9, 2023, which is a continuation-in-part of application No. 18/231,924, filed on Aug. 9, 2023, which is a continuation-in-part of application No. 17/560,333, filed on Dec. 23, 2021, which is a (Continued)

(51) Int. Cl.

| | |
|---|---|
| ***G06Q 30/02*** | (2023.01) |
| ***G06Q 30/0251*** | (2023.01) |
| ***H04L 41/082*** | (2022.01) |
| ***H04L 41/0853*** | (2022.01) |
| ***H04L 67/1396*** | (2022.01) |

(52) U.S. Cl.

CPC ....... *G06Q 30/0251* (2013.01); *H04L 41/082* (2013.01); *H04L 41/0853* (2013.01); *H04L 67/1396* (2022.05)

(58) Field of Classification Search

CPC .......... G06Q 30/0258; G06Q 30/0201; G06Q 30/0251; G06Q 30/0631; G06Q 30/0267; H04L 67/51

See application file for complete search history.

(56) References Cited

U.S. PATENT DOCUMENTS

2003/0103088 A1 6/2003 Dresti
2005/0210395 A1 * 9/2005 Wakita ............... G06F 21/6245 715/753

(Continued)

OTHER PUBLICATIONS

"Smart Entertainment in the Smart Home" (Whitepaper and associated webpages captured using Internet Archive Wayback Machine on Jun. 1, 2019 and Oct. 31, 2019 at https://quicksetcloud.com/ and https://quicksetcloud.com/media/, and retrieved by the Examiner on Jun. 25, 2024) (Year: 2024).*

(Continued)

*Primary Examiner* — James M Detweiler

(74) *Attorney, Agent, or Firm* — Greenberg Traurig, LLP

(57) ABSTRACT

Signatures extracted from API calls made from a remote control application are used to update a relational database in which is stored installed device information for a real-world, home network system of a user. The installed device information is then used to create a virtual-world, home network system of the user. Data obtained from an activity of an avatar of the user that result in a change in a configuration of the virtual-world, home network system functions to identify an advertisement that is to be provided to the user.

2 Claims, 18 Drawing Sheets

Related U.S. Application Data continuation-in-part of application No. 17/539,847, filed on Dec. 1, 2021.

(60) Provisional application No. 63/134,468, filed on Jan. 6, 2021.

(56) References Cited

U.S. PATENT DOCUMENTS

| | | | | |
|---|---|---|---|---|
| 2009/0259515 | A1* | 10/2009 | Belimpasakis | G06Q 30/02 709/218 |
| 2011/0161175 | A1* | 6/2011 | Aldrey | G06Q 30/02 705/14.66 |
| 2016/0299661 | A1* | 10/2016 | Alpert | G06T 17/05 |
| 2019/0362333 | A1* | 11/2019 | Agarwal | G06Q 20/3674 |
| 2019/0370401 | A1* | 12/2019 | Grant | H04W 4/70 |
| 2020/0098249 | A1* | 3/2020 | Eng | G08B 21/18 |
| 2022/0215435 | A1* | 7/2022 | Sueda | G06Q 30/0267 |
| 2023/0267526 | A1* | 8/2023 | Orofino | G06F 30/27 705/7.29 |
| 2024/0193886 | A1* | 6/2024 | Sadalgi | G06T 19/20 |
| 2024/0312071 | A1* | 9/2024 | Fuller | G06F 3/011 |

OTHER PUBLICATIONS

“Smart Entertainment in the Smart Home” (Whitepaper and associated webpages captured using Internet Archive Wayback Machine on Jun. 1, 2019 and Oct. 31, 2019 at https://quicksetcloud.com/ and https://quicksetcloud.com/ media/, and retrieved by the Examiner on Jun. 25, 2024).

Non-final Office Action from U.S. Appl. No. 18/231,924, dated Jun. 30, 2025, 28 pp.

* cited by examiner

Data Flow for the proposed Recommender System:

SYSTEMS AND METHODS FOR FACILITATING SHOPPING IN THE METAVERSE

RELATED APPLICATION INFORMATION

This application claims the benefit of and is a continuation-in-part of U.S. application Ser. No. 18/483,262, filed on Oct. 9, 2023, which application claims the benefit of and is a continuation-in-part of U.S. application Ser. No. 18/231,924, filed Aug. 9, 2023, which application claims the benefit of and is a continuation-in-part of U.S. application Ser. No. 17/560,333, filed on Dec. 23, 2021, which application claims the benefit of and is a continuation-in-part of U.S. application Ser. No. 17/539,847, filed on Dec. 1, 2021, which application claims the benefit of U.S. Provisional Application No. 63/134,468, filed on Jan. 6, 2021, the disclosures of which are incorporated herein by reference in their entirety.

BACKGROUND

Personal communication, productivity, and entertainment devices such as cellular phones, PDAs, portable email devices, tablet computers, e-books, hand-held games, portable media players, etc. (all referred to hereafter as "smart devices") are known to include features such as graphical user interfaces on color touch screens, Bluetooth and/or WiFi capability, etc. Increasingly, such smart devices also incorporate support for ancillary applications (hereafter referred to as "apps") for example calendars, email, maps and navigation, etc. Such ancillary applications may be pre-installed in a smart device or may be made available for download by a consumer.

Portable controlling devices capable of commanding the operation of multiple consumer appliances of different type and/or manufacture, such as universal remote controls, and the features and functions offered by such devices are also well known in the art. Sophisticated implementations of these devices incorporate technologies such as color touch screens, wireless home network compatibility, user configurable graphical user interfaces, non-primary relay stations positioned to control appliances not situated in line of sight of the controlling device, etc. In some cases, such controlling device functionality may be offered in the form of an app for installation on an existing smart device, said app comprising a GUI to be used in conjunction with supplemental hardware and/or firmware, built-in, or external to the smart device, suitable for the generation of appliance command signals. In other cases, such controlling devices may be self-contained units specific to that purpose such as for example Nevo® brand products from Universal Electronics Inc., or Harmony® brand products from Logitech Inc.

Regardless of the exact manner in which universal controlling device functionality is implemented, in general such devices or apps may require configuration or "set up" prior to use, i.e., an appropriate set of command data from within a library of command data sets must be associated with each of the specific appliances to be controlled, for example by entry of data that serves to identify each intended target appliance by its make, and/or model, and/or type; by testing various command formats sequentially, via command transmissions, until an appliance response is observed; by sampling signals of original equipment remote controls; etc.; all as known in the art. Since systems and methods for setting up universal controlling devices to command the operation of specific home appliances are well-known, these will not be described in greater detail herein. Nevertheless, for additional information pertaining to setup procedures, the reader may turn, for example, to U.S. Pat. Nos. 4,959,810, 5,872,562, 7,093,003, 7,653,212, 7,612,685, or U.S. application Ser. No. 16/717,546, all of which are incorporated herein by reference in their entirety.

Systems and methods for using information obtained from a universal controlling device are also known in the art. For example, U.S. application Ser. No. 13/118,682, filed on May 31, 2011, which application is incorporated herein by reference in its entirety, describes a system wherein, once such controlling device setup has been successfully performed, information regarding a consumer's appliance configuration gathered thereby may be advantageously used to provide additional services to the consumer, such as advice in the selection of additions or replacements to an existing equipment configuration, recommendations for preferred interconnections, etc.

While various services exist to allow data sellers to advertise, sell, and exchange data, a demonstrated need still exists to provide systems and methods that improve the data gathering and ultimate marketing of household user data as detailed below. For example, DATARADE is a software company operating in the commercial Data-as-a-Service (DaaS) market that helps companies to buy and sell data while TASIL provides a service that enables companies to take advantage of the data they already have to sell and communicate with their customers.

SUMMARY

This disclosure relates generally to the configuration of home appliance systems, and in particular to methods for recommending equipment expansions, additions and/or substitutions; interconnections; supplemental capabilities; features; services; etc. based upon a knowledge of a consumer's current equipment configuration and usage.

In some aspects, the techniques described herein relate to a method for providing a targeted advertisement to a user, including: using a device discovery process to automatically determine a configuration of a home network system of the user; storing data representative of the determined configuration of a home network system of the user in a data repository; using the data representative of the determined configuration of the home network system of the user to automatically verify a compliance by the user with a condition for receiving the targeted advertisement; and providing the targeted advertisement to the user when the determined configuration of the home network system of the user is determined to be in compliance with the condition for receiving the targeted advertisement.

In some aspects, the techniques described herein relate to a method for providing a targeted advertisement to a user, including: using a device discovery process to automatically determine a configuration of a home network system of the user; storing data representative of the determined configuration of a home network system of the user in a data repository; using the data representative of the determined configuration of the home network system of the user to provide an offer to monetize a transaction between the user and a provider of the targeted advertisement; determining an acceptance of the offer to monetize the transaction between the user and the provider; and using the data representative of the determined configuration of the home network system of the user to provide the targeted advertisement to the user upon determination of the acceptance to select at least one advertisement from a library of advertisements to present to the user; and causing the selected advertisement to be provided to the user.

A better understanding of the objects, advantages, features, properties and relationships of the disclosure will be obtained from the following detailed description and accompanying drawings which set forth illustrative embodiments and which are indicative of the various ways in which the principles of the disclosure may be employed.

BRIEF DESCRIPTION OF THE DRAWINGS

For a better understanding of the various aspects of the disclosure, reference may be had to preferred embodiments shown in the attached drawings.

DETAILED DESCRIPTION

Figure 1A:
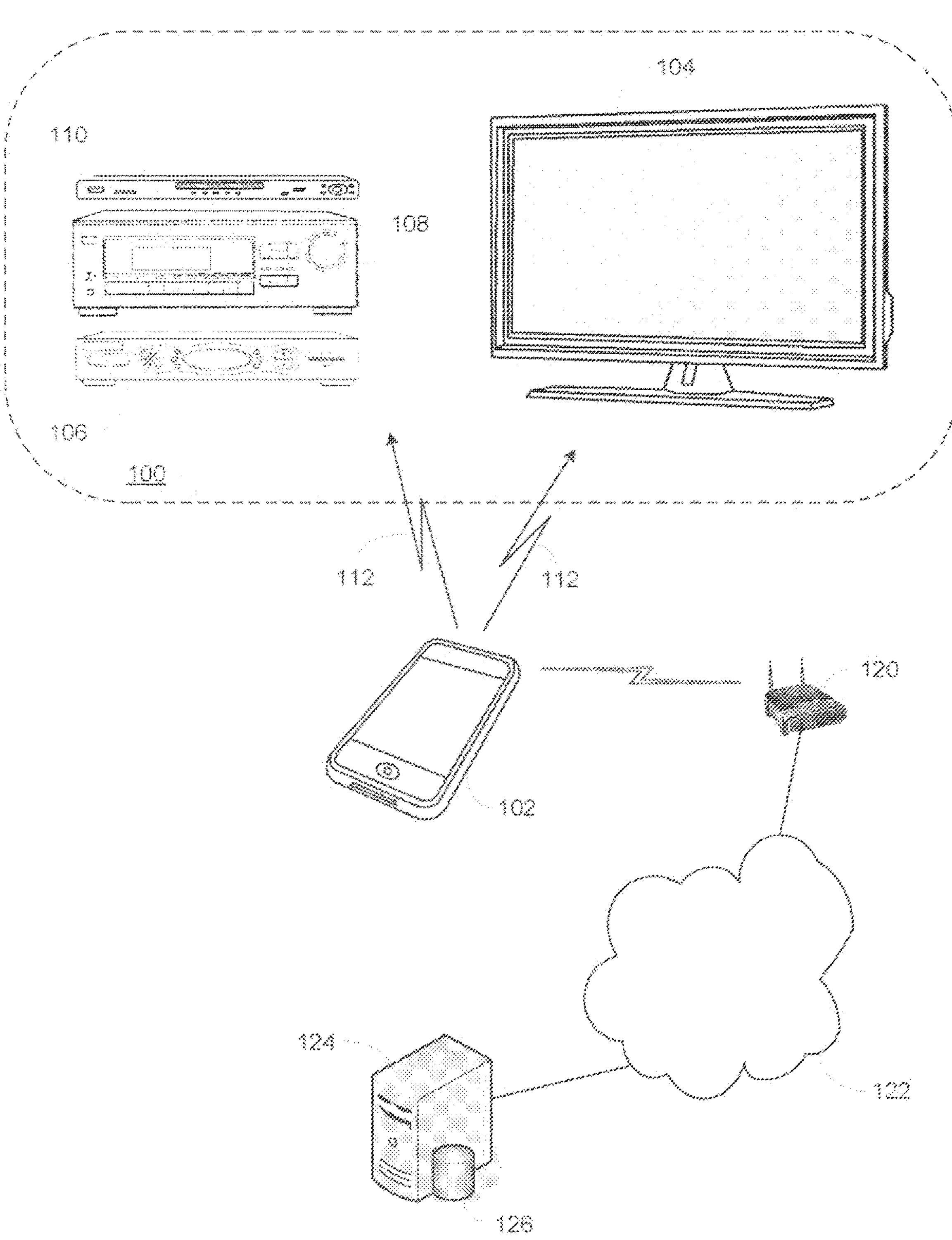
FIGS. 1A and 1B illustrate exemplary systems in which a product recommendation app according to the instant disclosure may be utilized.

As targeted advertising is carried out through various marketing channels (e.g., display advertising, social media marketing, mobile marketing using TVs, smartphones, PCs, tablets, or the like, and/or any other suitable marketing channel) under the connected home environment, business entities are oftentimes asked to be able to assess the effectiveness of their specific marketing channels and investments. In other words, businesses are increasingly being asked to understand the relationships between their marketing efforts through a specific marketing channel and the resulting purchases by the targeted household users. By gaining a deeper understanding in these areas, business entities are better able to identify and utilize the most effective digital marketing channels for their semi-automated marketing and sales activities. The applicants present QuickSet® protocol provides automatic detection of various connected household devices to identify brand IDs and device IDs.

The concept of causality is highly relevant for business entities to optimize return on investment and in this disclosure, is applied to the connected smart home environment based on machine learning methods to extract, compare, and exploit the structured casual effects derived for each marketing channel. For instance, targeted advertising techniques are disclosed whereby an administration system supports business entities to utilize market segmentation and implement automated randomization to generate treatment and control groups from the subpopulation of target household users. In addition, the administration system supports automated calculations, selection, and use of the most effective digital marketing channel based at least in part upon a causal analysis, such as Instrumental Variable analysis through the continuous use of the accumulated digital marketing system data involving business entities, service entities, and household users. In at least one example of the present invention, Two Stage Least Squares may be the applicable method to estimate causal effects of targeted advertising through a specific marketing channel under this setting.

Causal effects of targeted advertisements may be determined by various methods and systems, including for instance by assessing the contrast of potential outcomes on a common subpopulation and by utilizing a randomized controlled trial approach. More precisely, a common subpopulation of target household users who share common data feature characteristics may be set up by business entities when using the connectivity-based market segmentation service feature disclosed in the present application. By introducing automated randomization for the assignments of targeted advertising to the subpopulation of target household users, the present administration system establishes two groups: a treatment group and a control group. Accordingly, in the context of targeted advertising to household users through a specific marketing channel, contrast of potential outcomes on a common subpopulation involves analysis of actual outcomes from the subpopulation dataset (e.g. $Y=1$–autodetection of advertised devices/services; and $Y=0$–non-detection of advertised devices/services). The marketing channel with the highest causal effect value ($\beta 1$) is then automatically selected by the example administration system for further targeted advertising to the subpopulation as needed. Therefore, the example administration system may make marketing-channel recommendations to business entities based upon, at least, accumulated $\beta 1$ data from other integrated market-segmentation scenarios.

Based, at least in part, on actual outcomes of sending targeted advertisements to target household users, average causal effect(s) for a specific marketing channel after market segmentation is calculated as the difference in expected values with treatment versus without treatment.

As presently disclosed, example systems and methods for targeting household users are utilized to sell devices, services, and/or data. For instance, reverse advertisement capabilities to reach third party entities support the creation of a digital retailing platform for smart home systems. As disclosed, success of a digital retailing platform relies, at least in part, on a core infrastructure capability to harness network effects and dynamically attract buyers, sellers, and/or other related parties to one another. As presently disclosed, in one example, a digital marketplace is established to attract business entities and household users to one another based on a business-to-consumer targeted advertising feature with cross-side network effects. In another example, the example system establishes a digital cross-branding arrangement to attract business entities to one another with same-side network effects. Likewise, various additional network effects could be strengthened in the present systems by including digital retailing platform features that attract household users to one another, e.g., same-side network effects.

In one example of the presently disclosed system, a business-to-business (B2B) targeted advertisement for real-time selling of digital data records to data buyers is described. In this example, digital data records, including data such as user profile, home network system configuration, and user online records are made more available from connected devices and services under the connected smart home environment. The availability of digital data is, in this instance, exploited in as close to real-time as possible. For example, some business entities, such as data buyers, may be able to first analyze archived or new digital data records from the connected smart home system to acquire data-driven insights on the target households' behavioral patterns before proceeding with targeted-advertising spending. In other words, data-driven insights that are acquired under the relevant context may, in the example systems, help data buyers to carry out their targeted advertising activities strategically with more confidence and on a larger scale.

In one example method, a data buyer may use archived or new household user data and relevant digital data records from the connected smart home system to independently run a machine-learning or deep-learning algorithm to carry out a classification, detections, and/or processing task and create actionable, data-driven insights into the collected data. In this manner, user data can have a positive impact on data buyers.

Unlike the currently available systems, noted above, that involve remote data buyers and data sellers, the presently disclosed systems and methods enhance data-handling scenarios among data buyers, administration system (e.g., linked third-party services), and device/service sellers from a data monetization perspective.

For instance, in the present systems and methods, data buyers may enter search criteria and data purchase criteria into a user interface of the disclosed systems and as a result, they may receive business-to-business (B2B) targeted advertisements from the system in as near real-time as possible when the search criteria and data-purchase conditions for applicable digital data records are fulfilled. The present disclosure may be used to acquire archived and/or new digital data records from a specific data-collection period and marketing phase based on targeted advertising records of other business entities over time. In this way, data buyers can acquire relevant digital data records in near real-time and on an as-needed basis for additional analysis.

In addition, the disclosed systems and methods, including any linked third-party services, do not require manual uploading of digital data records to a data monetization platform, such as described in the prior art. Rather, in the present systems and methods, digital data records are automatically captured in real-time, or near real-time, and maintained by the disclosed administration system and linked to various third-party services.

Accordingly, in the present disclosure, device and/or service sellers may receive a portion of data sales revenue from the disclosed administration system and any linked third-party services for every individual transaction through which digital data records are purchased by data buyers upon fulfillment of search criteria and data-purchase conditions. In this fashion, transactional arrangements may further incentivize various business entities to utilize semi-automated marketing and sales processes for smart home systems, thereby enhancing network effects at the ecosystems level.

In another example, the disclosed system allows for consumer-to-consumer (C2C) targeted advertising whereby the system allows consumers (household users) to carry out selling/purchasing processes directly among one another for their auto-detected devices, services, and/or data. The auto-detected devices, services, and/or data that are put up for sale may be reused, curated, independently developed by household users for network compatibility and selling to others, or the like.

By combining auto-detection, smart-home-specific features, and relevant interlinking household user data features that are continuously accumulated by the disclosed administration system, along with related system databases, the example administration system disclosed herein can allow business entities to conveniently set up and analyze various types of market-segmentation scenarios as a connectivity-based representation of new opportunities to sell relevant devices/services to target household users. It will be understood that in one example, the applicant's own QUICKSET protocol may provide automatic detection of various connected household devices to support brand identifications and device identifications. More precisely, connectivity-based application of market segmentation allows business entities to finetune and extract relevant interlinked information on new target business opportunities before sending targeted advertisements to household users.

In one example, the disclosed systems and methods allow for market segmentation which is a valuable tool for business entities to concentrate limited resources to achieve the best possible conversion rate of targeted advertisements. Market segmentation types include, but are not limited to the following: geographic segmentation, such as the application of country IDs, sets of longitude/latitude coordinates of detected devices/services, home address based on geolocation, or the like; demographic segmentation such as application of knowledge graphs under a smart home account such as family profile, age, occupation, education level, or other suitable demographic; psychographic segmentation including application of knowledge graphs under a smart home account including interests, hobbies, or the like; and behavioral segmentation, for instance, application of IDs under smart home accounts for recency/frequency of purchases and their monetary values, usage rates, brand loyalty, or other suitable metric.

Various finetuning methodologies may be utilized. For instance, in one example, the administration system may finetune and extract relevant, interlinked information on new target business opportunities before sending targeted advertisements to household users. A finetuning and extracting process may involve checks of smart-home-specific features such as which room or position a specific device and/or service is located, etc. In still other instances, the examples systems and methods may check smart-home-specific features as well as target household user features based on various market-segmentation scenarios. Further, market-segmentation types to finetune and extract new target business opportunities may include and are not limited to geographic segmentation, demographic segmentation, psychographic segmentation, and/or behavioral segmentation or a combination thereof as appropriate.

Still further, under the example connected smart home environment system and methods disclosed herein, business entities can expand their business opportunities further by exploiting target household users' connections and/or networks, including associates and friends. The logic of the disclosed systems and methods comprises at least the concept of homophily, wherein people with strong social connections tend to share similar preferences and interests. In other words, if a particular household user purchases and/or likes a particular product and/or service, there is a reasonable likelihood that acquaintances would share that affinity. Thus, the example administration system disclosed herein is capable of carrying out a sharing process among the social networks in an automated and/or user-activated manner which, in turn, helps to enhance a viral-marketing feature for business entities to increase conversion rates.

Under the connected smart home environment, the disclosed administration system supports automated and/or user-activated sharing of related advertisements among a household users' close friends. A close friend may be any suitable relationship, including acquaintances, family members, or the like. Network targeting and referral marketing are then applied under the disclosed systems and methods to help various business entities increase their reach and conversion rates.

For example, as a general practice of advertising based upon the interests of household user's acquaintances, including social networks, network targeting is applied under the presently disclosed systems and methods to help business entities increase their reach and conversion rates in an automated manner including at least the following scenarios. In one example, when a target household user purchases a product and/or service in response to a targeted advertisement, related targeted advertisements may be automatically generated and forwarded to their close friends within proper privacy regulation limitations. When the household users' close friends then purchase a product and/or service in response to the targeted advertisement, related targeted advertisements are similarly automatically generated and forwarded to their respective acquaintances. In this manner, the targeted advertisement may grow in relevancy.

In another example, referral marketing, e.g., user-activated sharing, is applied in the presently disclosed systems and methods to help business entities increase their reach and conversion rates including in at least the following scenarios. In one example, after purchasing a product and/or service, in response to a targeted advertisement, a target household user may purposefully activate a referral to transmit related advertisements to their close friends, again within various privacy constraints. In turn, after purchasing a product and/or service in response to a referral targeted advertisement, close friends may activate another referral to transmit related advertisements to their respective close friends, and so forth.

It will be appreciated that in order to facilitate automated and/or user-activated sharing of related advertisements among friends, the disclosed administrative system will utilize connectivity contact databases, such as for instance, social media sites, or the like. These connectivity contact databases may represent a multitude of household users' close contacts and/or networks such that those among the close social network may be automatically and/or manually purposefully shared with related advertisements of purchased or recommended products and/or services.

In one example, a household user may initiate a selling process by using a smartphone or a similar device. In this instance, the user accesses a smart home system service menu and selects or otherwise chooses the specific auto-detected device/service/data for sale. For the example selling process, the household user may input any selling process, including setting a selling price, requiring an auction, etc. Additionally, the administration system automatically can scan household configuration and related data of other household users (potential buyers) to verify compliance and provide targeted advertisements (e.g., C2B, C2C, etc.). In one example, some of the compliance conditions may include a requirement that the target household does not already own the specific device/service/data on sale, the target household users have accepted an option to receive targeted advertisements, and the administration system scanning and automatically selecting target household users based upon predetermined filtering/segmentation algorithm (e.g., prioritize for nearby household users, etc.). It will be understood that once compliance is verified, the example systems and methods may initiate a targeted advertisement for the appropriate device/service/data on sale.

Figure 1B:
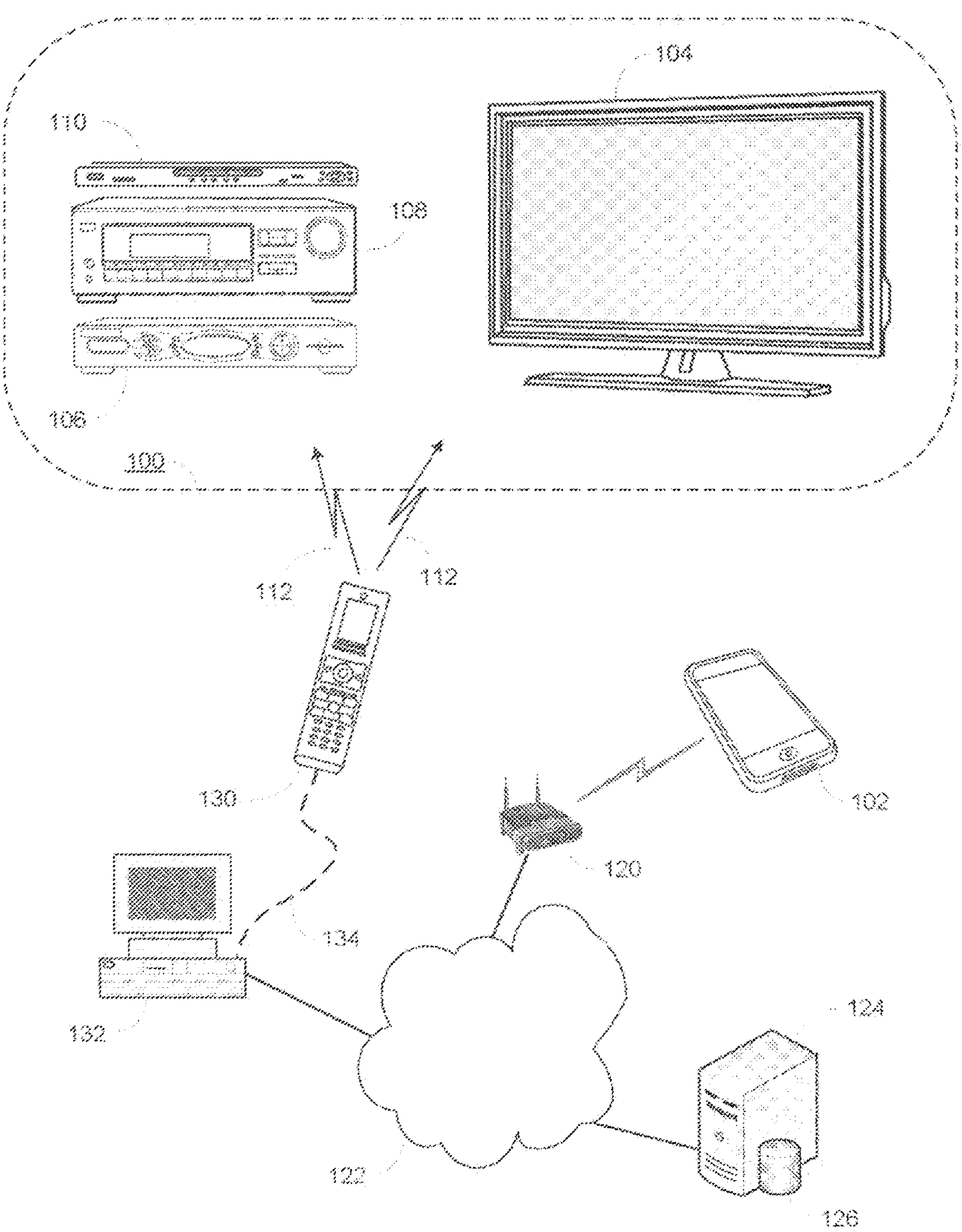

The following describes systems and methods for making recommendations to a consumer concerning additions to, modifications of, and/or usage of an existing system of electronic consumer appliances. By way of example, FIGS. 1A and 1B illustrate an exemplary system 100 wherein a smart device 102 may be used to acquire recommendations regarding a consumer's system of controllable appliances such as a TV 104, set top box (STB) 106, AV receiver 108, DVD player 110, etc. While illustrated in the context of a home entertainment system comprising a TV, STB, DVD player and AV receiver, it is to be understood that controllable appliances may include, but need not be limited to, televisions, VCRs, DVRs, DVD players, cable or satellite converter set-top boxes ("STBs"), media streaming devices, amplifiers, AV receivers, CD players, game consoles, home lighting, drapery, fans, HVAC systems, thermostats, personal computers, etc. In the illustrative example of FIG. 1A, the smart device 102 includes a both a product recommendation app and a resident universal remote control app, which apps may be provisioned separately or in combination as a package as appropriate for a particular embodiment. The universal remote control app serves to adapt smart device 102 to command the operation of the illustrated appliances while the product recommendation app serves to advise a user of the smart device 102 regarding suitable additions or substitutions to equipment configuration 100, usage thereof, and/or the like as will be described in detail hereafter. Appliance commands may be issued in the form of infrared signals 112 as illustrated, or in any suitable format, e.g., via an RF signal such as contemplated by RF4CE, Zigbee, Bluetooth, etc.; ultrasonic signal; visible light; etc. as appropriate for the control of each particular appliance. In the example of FIG. 1A these command signals may be issued directly by smart device 102 using, for example, the technology described in co-pending U.S. patent application Ser. No. 13/043,915 or alternatively may be issued by a relay device (not illustrated) which is in wireless communication with smart device 102 using, for example, the technology described in co-pending U.S. patent application Ser. No. 13/071,661, both of which are incorporated herein by reference in their entirety. In addition, smart device 102 may be capable of communicating with a server 124 via, for example a WiFi or cellular wireless access point 120 and a wide area network 122 such as the Internet or PSTN. Server 124 may support a database 126 comprising downloadable command codes and data, equipment setup configurations, appliance datasheet and compatibility information, recommendation database, etc. as required for a particular embodiment.

As illustrated in FIG. 1B, in an alternative configuration appliance control functionality may reside in a physically separate smart device such as a universal remote control 130, a virtual voice assistant (such as the "AMAZON" "ECHO" brand voice assistant), or the like without limitation. The smart device 130 may be configurable via a PC 132, standalone or in conjunction with a server-based database 126, using any convenient wired or wireless connection 134 as is well known in the art. In alternative embodiments smart device 130 may communicate directly with server 124 via a wireless link and access point 120. In the examples of both FIGS. 1A and 1B however, appliance data, i.e., type, brand, and model information, equipment configuration, etc., that is gathered during setup and programming of a controlling device may be made available to a product recommendation app resident in smart device 102, either directly from the controlling device 130 or from the smart device 102 accessing a cloud server 124 to which such data has been previously provided by the controlling device 130.

Figure 2:
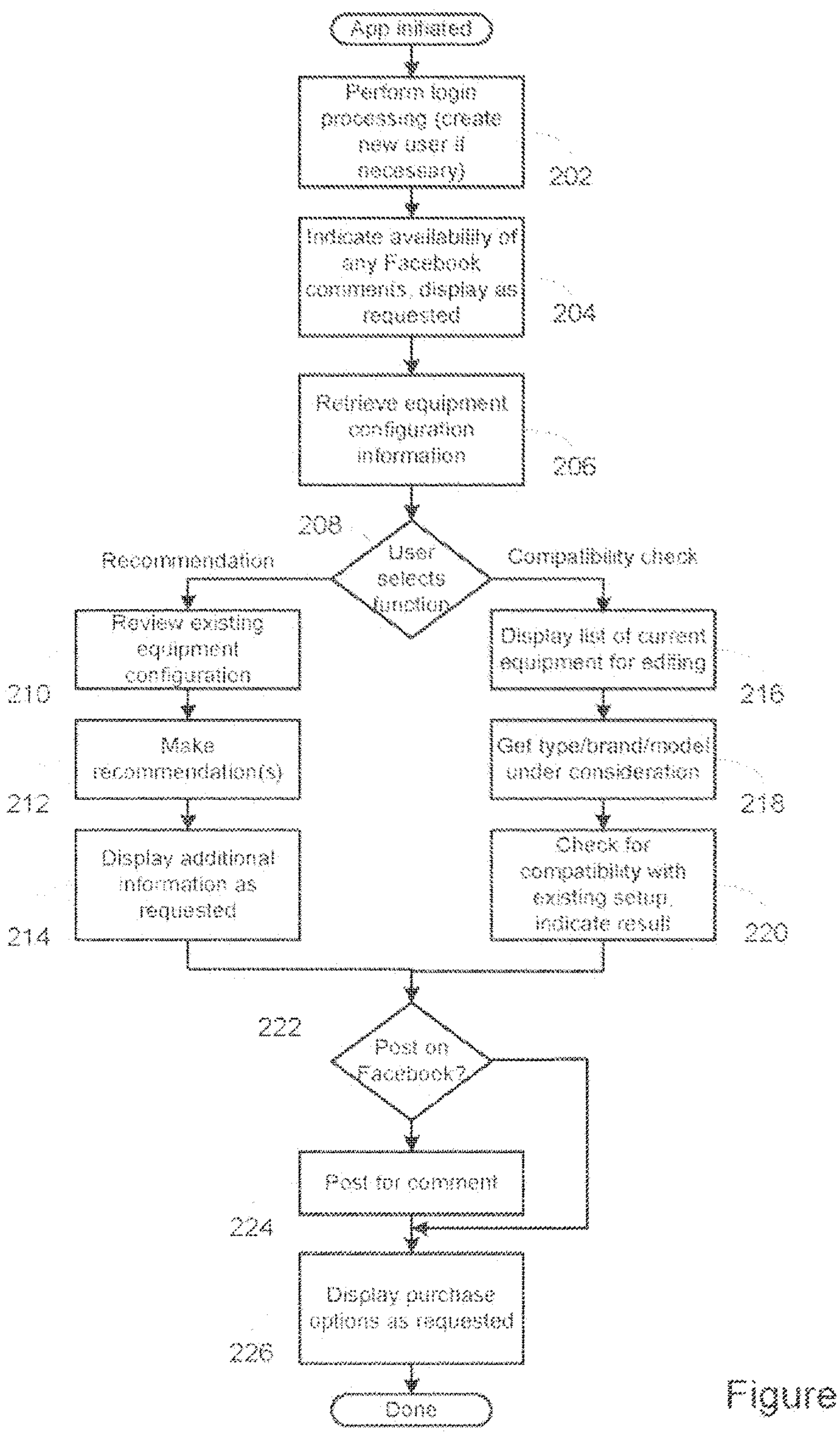
FIG. 2 illustrates, in flowchart form, the operation of an exemplary product recommendation app.
Figure 3:
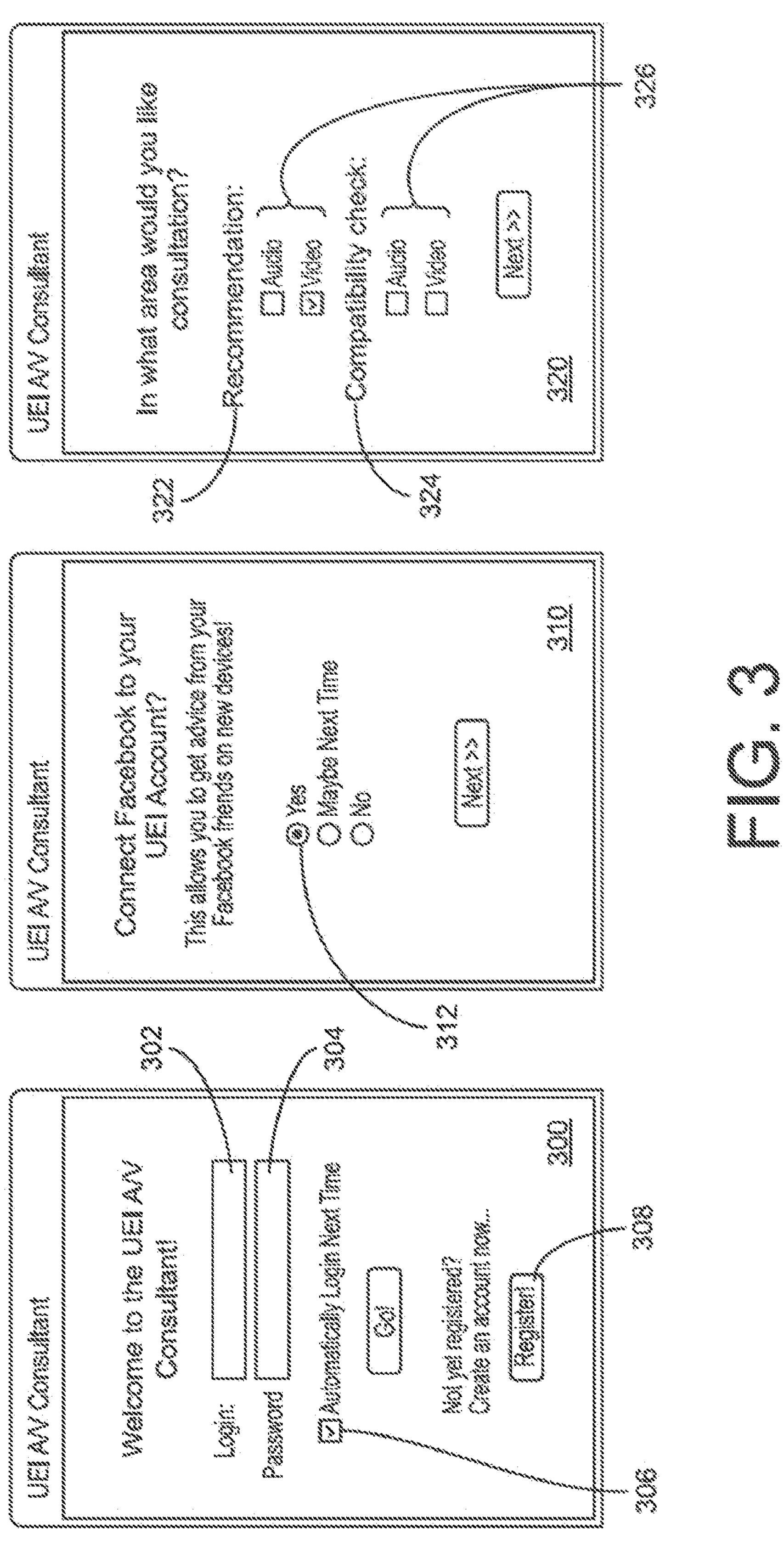
FIGS. 3 through 6 illustrate smart device screen displays during the operation of an exemplary product recommendation app.
Figure 4:
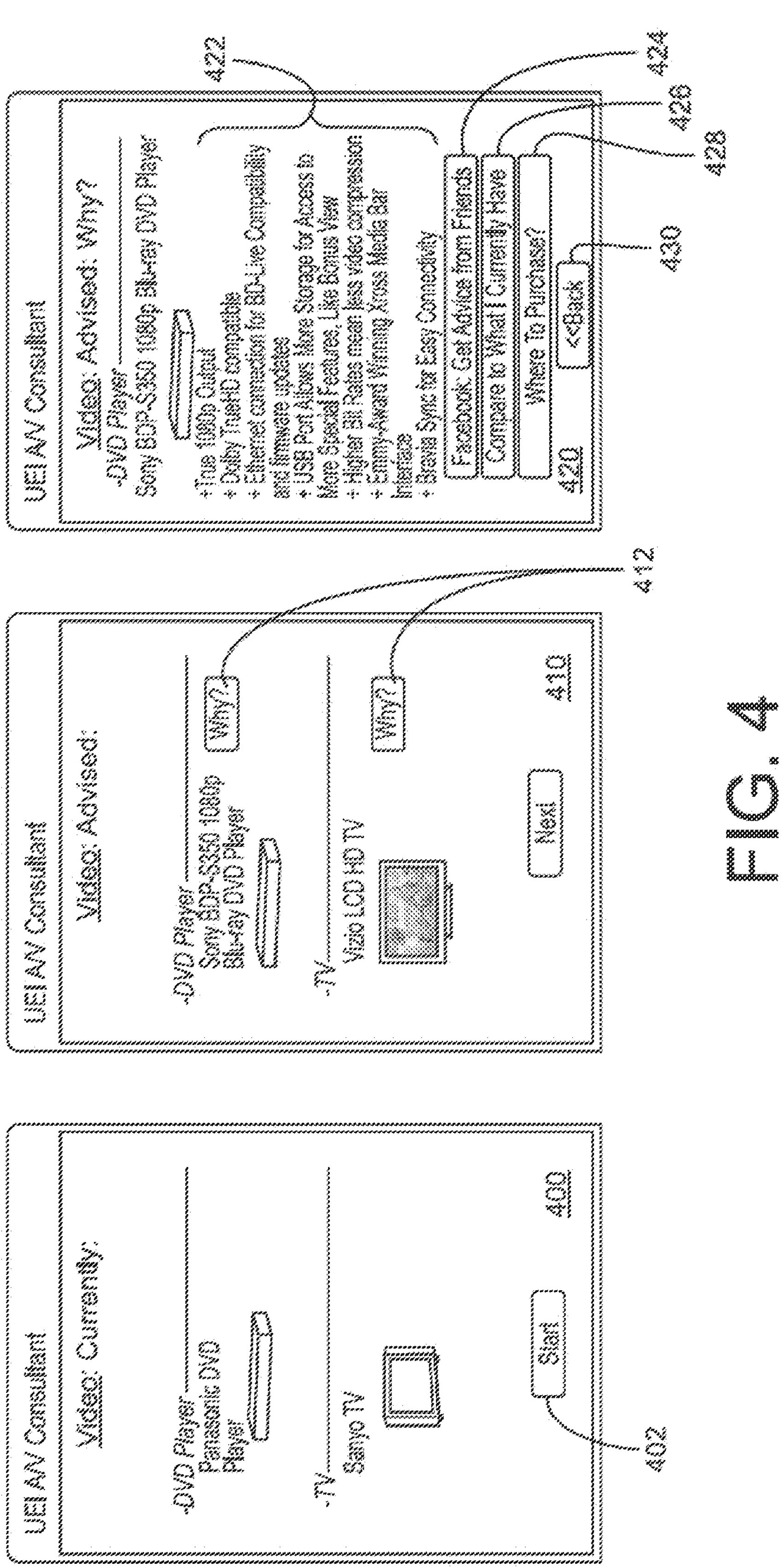
Figure 5:
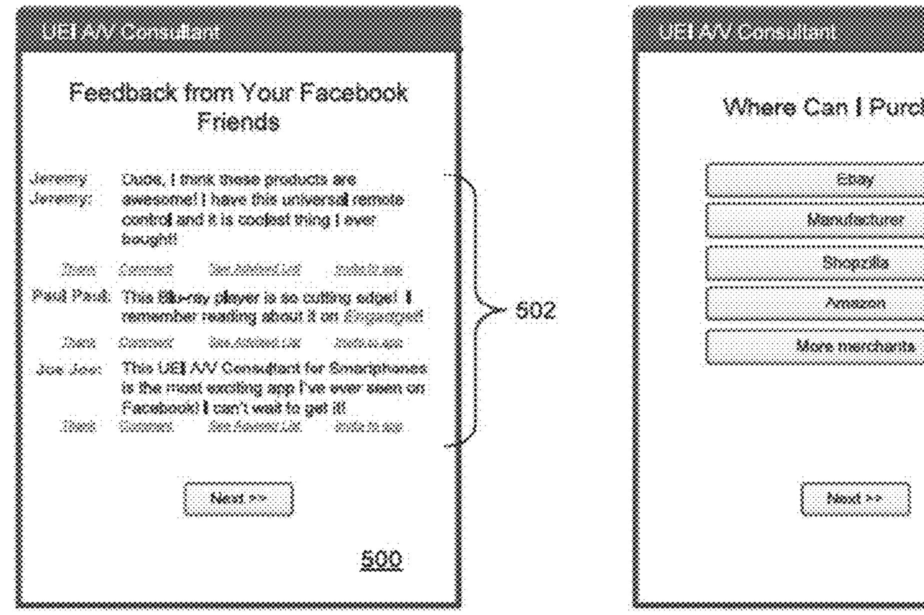
Figure 6:
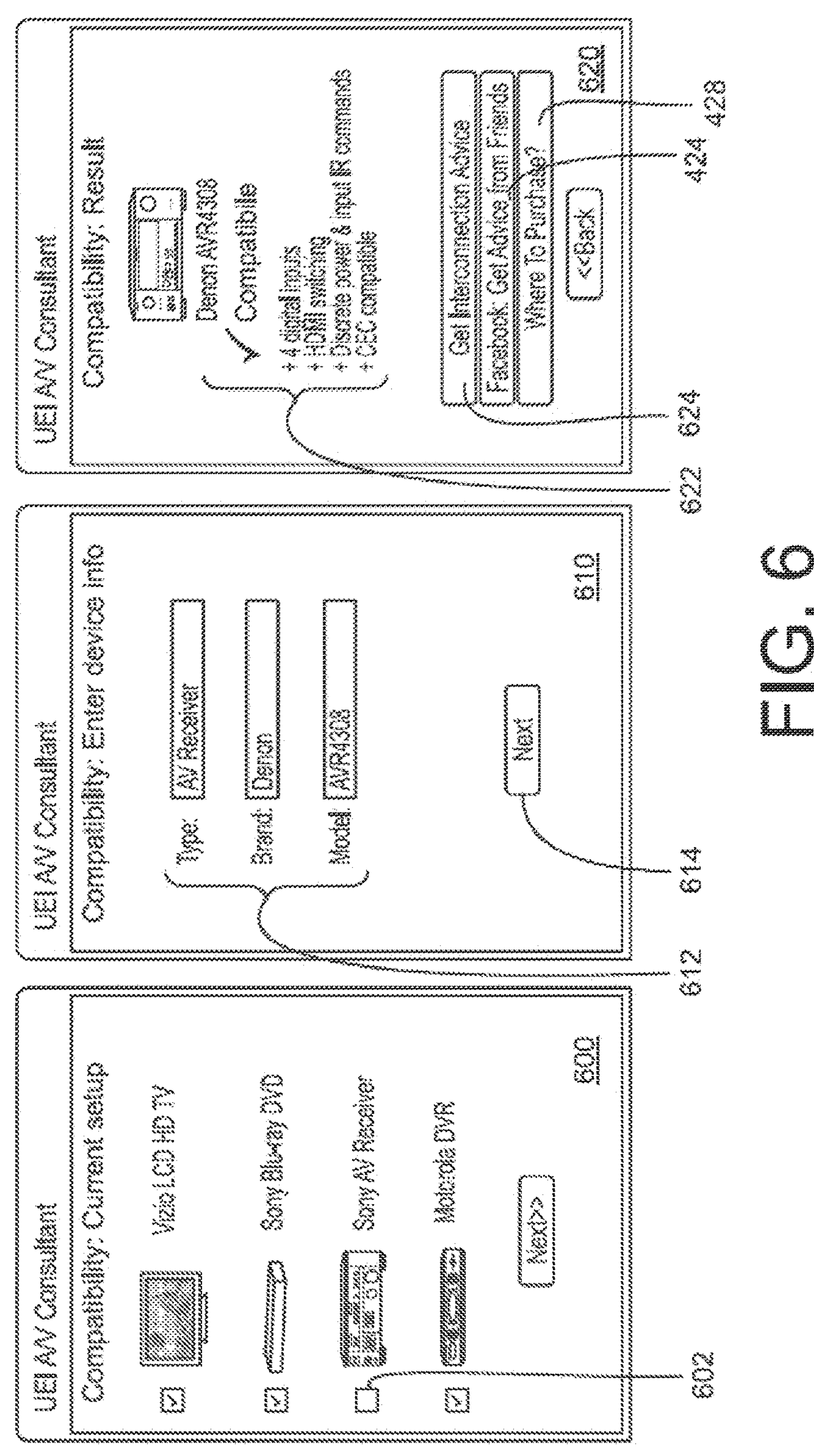

With reference now to the flowchart of FIG. 2 and accompanying illustrative screen displays of FIGS. 3 through 6, an exemplary product recommendation app, e.g., an application implemented via computer-executable instructions stored on one or more non-transient, physically embodied storage media of one or more devices such as a server, smart device, and/or the like, may, upon initialization at step 202 request that a user enter a login name 302 and password 304 which may be used to identify a particular user and their current equipment configurations. In some embodiments, this user identity may correspond to a user account which has already been created elsewhere, for example created on server 124 in connection with configuring a PC-editable smart device 130, while in other embodiments this user account identity may be unique to the product recommendation function, in which latter case a first-time user may be required to register and create an account, for example by activating a "Register" icon as illustrated at 308. In either case, a user may also be able to request that the login screen be bypassed in the future, for example as illustrated by check box 306.

In addition, as part of the login process a user may be offered an opportunity to link to a social networking account such as for example, without limitation, a "FACEBOOK" brand social networking account as illustrated at 310. Selecting "Yes" 312 may take the user to a screen wherein the desired account information is entered. Where the user already has a linked account, at step 204 screen 310 may be substituted by a display indicating whether or not there are unread friend comments pending at the social networking site. If there are, at the request of the user these comments 502 may be displayed as illustrated in the exemplary computer screen 500 of FIG. 5.

Once login is complete, at step 206 the current equipment configuration data associated with that user account may be retrieved by the product recommendation app in preparation for the steps which are to follow. As will be appreciated, such configuration data may be stored locally on smart device 102, on a local PC 132, on a remote server 124, or a combination thereof as appropriate for a particular embodiment. Next, at step 208 the user is offered a choice of a product recommendation (where "products" may include apps as well as physical devices) or a product compatibility check, as illustrated at screen 320. In this context, a product recommendation comprises a review of the items in a user's current equipment configuration with the objective of generally suggesting improvements and/or additions to the user's current equipment configuration; while a compatibly check comprises a review of a particular user-specified product which is not currently part of an equipment configuration, with the objective of determining if this item is compatible with the existing equipment as currently configured. As illustrated by checkboxes 326, a user may be provided with an opportunity to further limit these reviews to only certain products or functionalities, for example audio or video appliances or functionalities as illustrated (or both, if more than one box is checked.)

Considering first the product recommendation mode, at step 210 the existing equipment configuration may be retrieved and displayed to the user as illustrated for example at screen 400. Once a user has verified that the retrieved configuration is correct, for example by selecting "Start" 402, the listed configuration may be reviewed for adequacy and compatibility. In this regard, it will be appreciated that the steps comprising the review algorithm may be performed locally on the smart device, performed remotely at an associated server, cloud-based and/or local, or a combination thereof as appropriate for a particular embodiment. Similarly, it will be understood that data indicative of the current equipment configuration and data used for reference during the review process may be either locally resident on the smart device or hosted by a server, in any convenient combination.

In determining the adequacy of an existing configuration an exemplary review algorithm may, for instance when applied to the illustrative AV system configuration 100, consider factors such as:

- Ability of a device and/or system to support currently available (and/or future) formats, e.g., HDTV, Blu-ray DVD, DTS audio, 3DTV, etc.;
- Ability of a device and/or system to support currently available (and/or future) content delivery methods, e.g., on-line video and audio streaming services, IPTV, HD radio, etc.;
- Ability of a device and/or system to support currently available (and/or future) connectivity, e.g., HDMI, WiFi and/or Ethernet capability, USB and SD card interfaces, etc.;
- Energy efficiency of a device; and
- Inconsistencies in the existing device and/or system configuration, e.g., a Hi-Def DVR or Blu-ray player connected to a Standard Definition TV.

Once any inadequacies or inconsistencies have been identified, at step 212 recommended improvements for a device/the system may be determined and presented to the user, for example as illustrated in screen shot 410. In this regard, factors that may be considered in identifying suggested replacements or additions to the device(s) and/or system configuration may include:

- Features and capabilities of a device and/or system necessary to rectify the identified inadequacies;
- Support by a device for nascent technologies (i.e., future proofing);
- Cost of recommended device(s), which factor may be influenced by the price brackets represented by the existing system devices;
- Dimensions of a device;
- Operational compatibility of a device, e.g., support for CEC, EDID, RF4CE, etc.;
- Reliability and/or user satisfaction ratings for a device;
- Device purchase statistics derived from a user's peer group, i.e., other consumers with similar device and/or system configurations and/or demographics.

In this regard, in certain embodiments, user-specified filtering parameters may also be applied during this identification process, for example upper limits on price and/or dimensions, brand preference, etc. Input of such parameters may be solicited from a user at the start of the recommendation process (i.e., in conjunction with steps 210 and 212), or may be provided during initial installation and setup of the product recommendation app, as appropriate.

In addition, in certain embodiments where a database of device command code sets is available for reference, for example where the product recommendation app is provided by or hosted by a manufacturer of universal controlling devices or of universal remote control apps for smart devices, the suitability of an appliance's command set may also be taken into account, for example:

- Availability of discrete power and input selection commands by a device in support of activity macros;
- Preferred method of command transmission by a device, e.g., if a majority of the other devices in the existing configuration support non-line-of-sight command transmissions, such as for example the RF4CE protocol, preference may be given to replacement devices which are compatible with that command protocol;
- Possible conflicts in command code format with devices already present in the existing configuration; etc.

Figure 7:
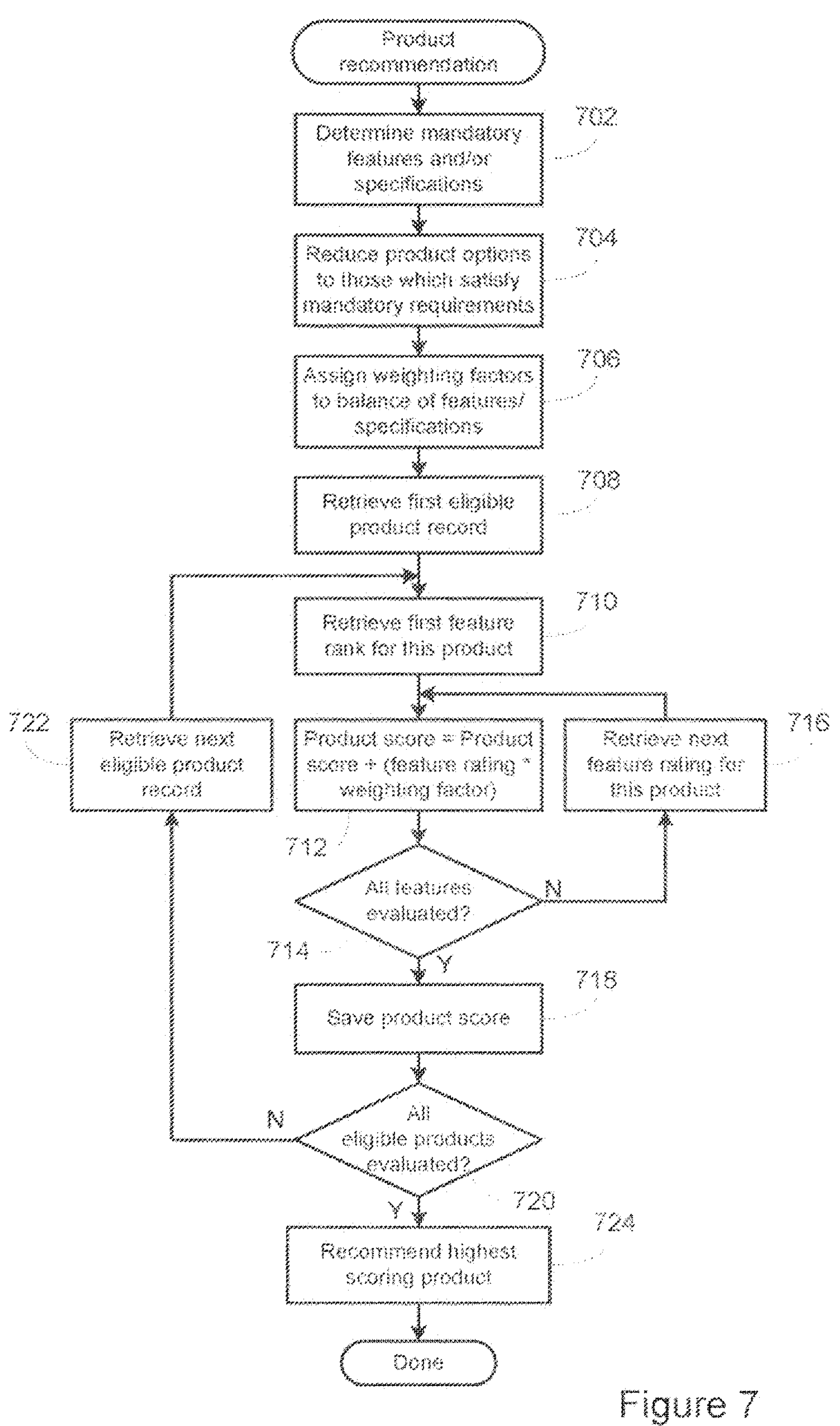
FIG. 7 illustrates, in flowchart form, an exemplary product recommendation algorithm.
Figure 8:
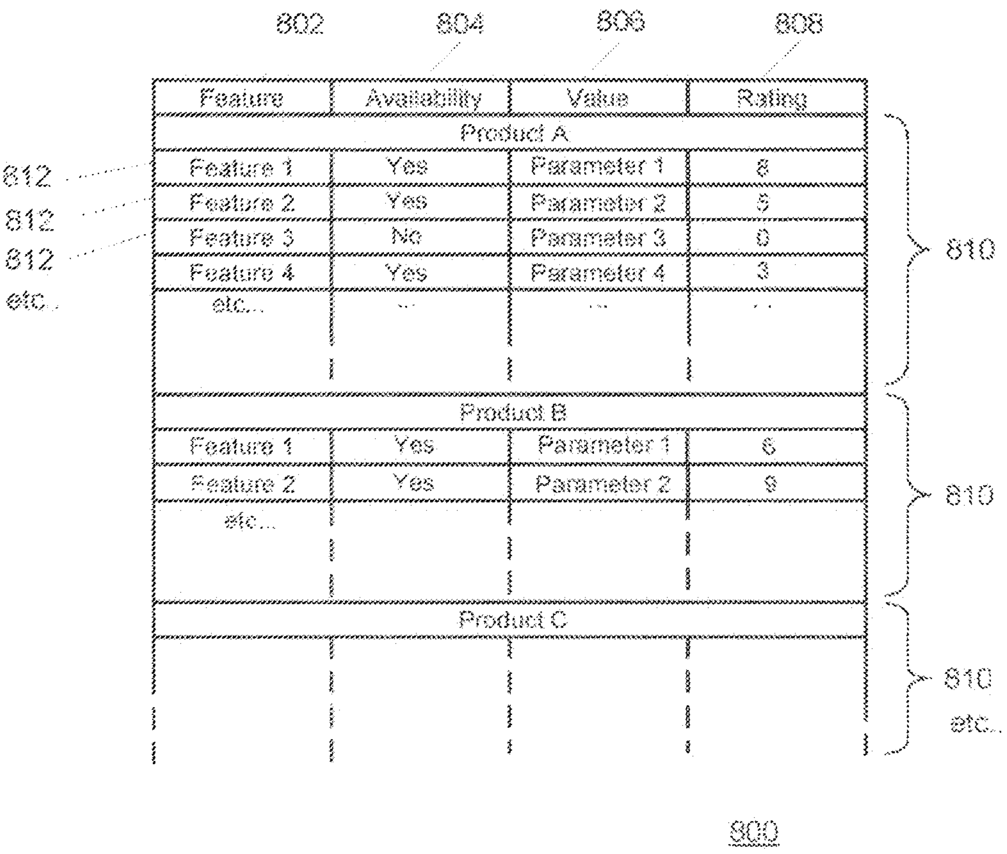
FIG. 8 illustrates a product feature database which may be used in conjunction with the algorithm of FIG. 7.

By way of further example and without limitation, a product recommendation method and associated database are illustrated in FIGS. 7 and 8. Turning to FIG. 7, at step 702 first a determination is made as to which product features are mandatory. These may include for example support for formats necessary for compatibility with other existing equipment (with all of equipment, devices, appliances, items, and products being interchangeably used herein as appropriate) in a user's configuration (e.g., HDTV compatibility), regional requirements (e.g., supply voltage, DVD region, PAL vs NTSC, etc.), user-supplied filtering parameters such as maximum price or dimensions, etc. Next, at step 704 a product selection database may be scanned and those entries which satisfy the mandatory requirements selected as entries that are eligible for further examination.

With reference to FIG. 8, an exemplary product recommendation database 800 may comprise a series of product records 810, each record in turn comprising a series of feature definition entries 812, each feature definition entry comprising a series of fields 802 through 808. Field 802 may be a feature reference or type (e.g., HD capable, HDMI input, reliability rating, user survey rating, etc.), field 804 may contain an indicator as to whether this feature is available on that particular product, field 806 may contain any parameter associated with that feature (e.g., screen resolution, number of inputs, etc.), and field 808 may comprise a rating value (e.g., between zero to ten) representative of the completeness or functionality of that particular feature as implemented within that product, or in the case of survey results, etc., a value representing a relative ranking within that appliance's peer group. For a feature which is absent, rating value entry 808 may be zero. As will be appreciated, though illustrated for convenience as a unified data set, in practice the data values corresponding to the fields of database 800 may be distributed across multiple locations, for example any or all of the fields 802 through 808 may comprise a pointer to a data value located elsewhere, such as a manufacturer's website, a product rating organization's report database, etc. In the illustrative example, any or all of the contents of fields 802 through 806 for each product maintained in the database may be examined during the initial selection process of step 704.

Once a set of qualifying products has been selected, at step 706 a weighing factor may be assigned to each of the remaining non-mandatory features based on that feature's relative importance to the known equipment configuration in which it is to be used. In some embodiments, some or all of such weighing factors may also be user-adjustable according to personal preferences, e.g., cost. After weighing factors are established, at step 708 a first product record from the set of eligible records is retrieved, and at steps 712, 714, and 716 a product score may be accumulated, calculated in the illustrative example as the sum of the products of each participating feature's rating 808 and the weighing factor established in step 706. Thereafter, at step 718 the total score for that product may be saved, and at steps 720 and 722 the process repeated until all eligible products have been scored. Upon completion of score calculations, at step 724 the highest scoring product may be returned as a recommendation and the process is complete.

Figure 9:
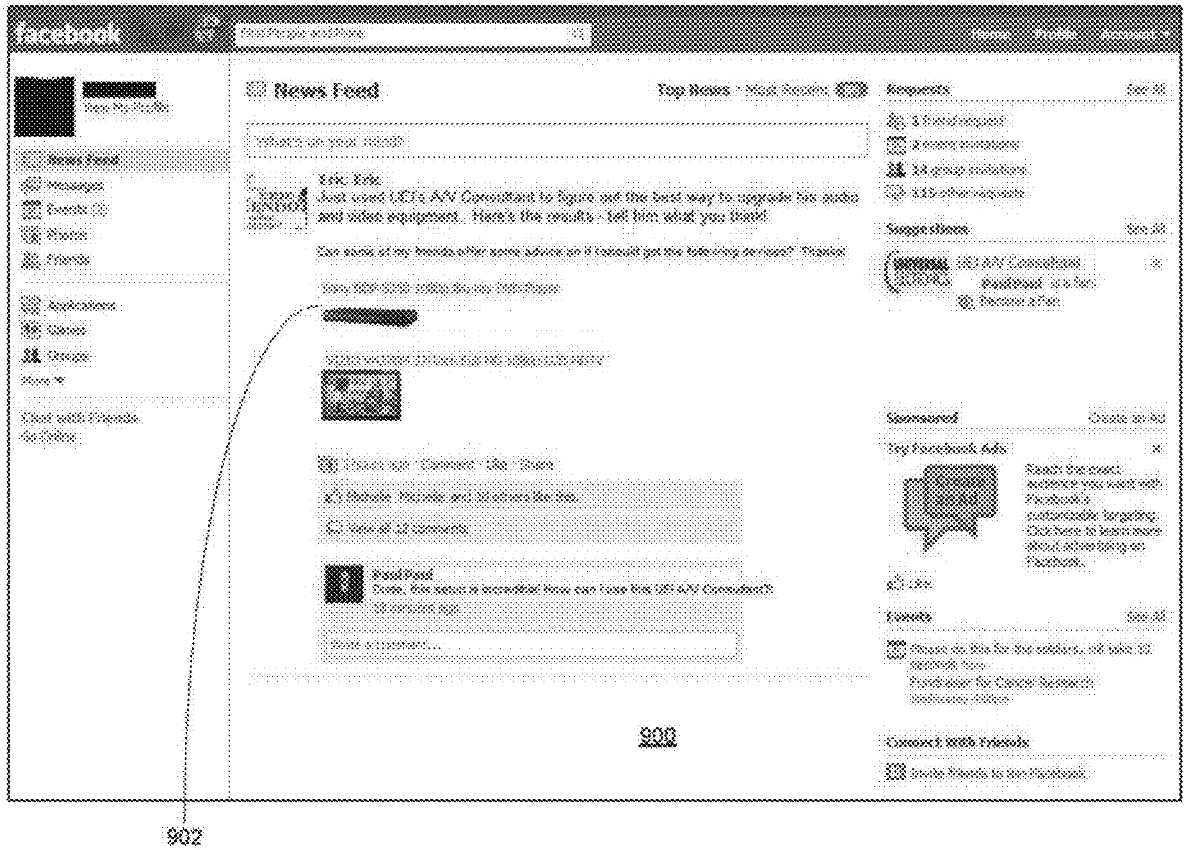
FIG. 9 illustrates an exemplary "Facebook" brand social media page soliciting friends' opinions regarding a recommended product.

Once suggested replacement or add-on products have been thus identified, these may be displayed to the user of the smart device, for example as illustrated in display 410. Returning to FIG. 2, at step 214 the user may be presented with an opportunity to display additional information regarding the recommended products, for example via activation of an icon 412 as illustrated. Selection of one of the icons 412 may result in the display illustrated at screen 420. This display may include a summary 422 of the features of the recommended product together with icons representing possible next actions by the user, for example: posting the recommendation to a user's social networking account for comment using icon 424, comparison of the recommended item to the product it is to replace in the current system configuration (if any) using icon 426, obtaining product purchase information using icon 428, or returning to screen 410 to review other recommended products (if any) using icon 430. As illustrated in FIG. 9, selection of icon 424 at step 222 may result in the posting at step 224 of information 902 regarding the recommended product to that user's social networking page 900. Selection of icon 428 may result in a display at step 226 as illustrated at screen 510, comprising a listing 512 of links to merchants selling the recommended item. As will be appreciated, such merchant information may be obtained via use of known web-scraping technologies, may be provided by the merchants themselves (e.g., via an affiliates agreement), or the like.

Considering now the product compatibility or "shopping companion" mode of system usage, a consumer may wish to use the smart device app of the current disclosure to verify the compatibility of a particular electronic appliance with their existing configuration, based upon for example an advertisement, a recommendation from a friend or a salesperson, a store display, etc. In such cases, after initiating the product recommendation app as described previously, at step 208 the compatibility check mode 324 may be selected. Initially, at step 216 a listing of the user's currently configured electronic appliances may be displayed as illustrated at screen 600 of FIG. 6. In the exemplary embodiment, the user may be afforded an opportunity to remove from that configuration any product which is to be replaced by the new product under consideration, for example by causing a box to be "unchecked" as illustrated at 602, thereby removing that appliance from the compatibility check process which is to follow. After completing any such input, a user may confirm the remaining equipment configuration and proceed to step 218 by selecting a "next" icon 604. At step 218, the user may be prompted to identify the type, brand, and model of appliance under consideration, as represented by fields 612 of screen 610. As will be appreciated, such identification may be by selection from a drop-down list, direct text entry with or without auto-complete, voice input, etc., as appropriate. In addition, the system may automatically identify the appliance under consideration from an uploaded photograph of the appliance under consideration, its packaging, or the like; from a captured product code associated with the appliance under consideration such as for example a UPC barcode, an RFID tag, or the like; a link to a product detail page; etc. Once entry of such identification information is complete, a user may initiate a compatibility check by once again selecting "next" 614.

At step 220, a compatibility check algorithm may be performed. The factors considered in this process may be similar to those previously enumerated above, but excluding for example cost and dimensions since these are no longer variables. In addition, the compatibility check may incorporate further steps such as verifying that a sufficient number of suitable connections and input/output ports are available to allow optimal integration of the proposed appliance in the system, etc. Once compatibility checking is complete, at step 220 the result may be displayed to the user as illustrated at screen 620. An exemplary display may include a summary 622 of the salient points considered in determining compatibility. Some embodiments may include an option for the display of additional information screens containing, for example, recommended interconnection schemes and methods, etc., which in the illustrative example may be accessible via icon 624. In addition, options for posting to social media 424 and locating a merchant 428 may be offered as previously described.

In a further example, the subject recommendation system may be used by consumers who are planning to upgrade their smart home or current set of connected smart devices with the intention of enhancing their smart home experience. The recommender will provide ideas to consumers which will help them with decision making before the consumer buys and/or installs an additional smart device or smart device related product, e.g., an app or a skill, for use in their home. The system can recommend the most popular smart devices, brands, and models, the device or brand combination that is most popular, most often bought and sought after, additional smart devices/products most commonly used by the customers having similar configuration, etc. which will also ensure interoperability of the recommended products with the current setup. In some circumstances, the consumer's geo location, zip code, or other region identifier can be used such that recommendations can be narrowed down or clustered based on availability of product/service providers in the consumer's neighborhood making the recommendations more accurate and customized for the consumer.

For determining the current configuration of the consumer's system (e.g. installed appliances, accessories, apps, and/or the like), the recommendation system can use one or more of the discovery processes described in U.S. application Ser. No. 13/657,176, which application is incorporated herein by reference in its entirety. For example, the current configuration of the consumer's system/devices" can be determined via use of a process that functions to autodetect connected IoT devices in a home network. The information collected during such a process will feed the recommender with the user's current system and/or device setup, the inclination of the user towards buying a specific category or brand of product, etc. This information, along with the history of recommendations the user has previously requested, if any, can be stored in a backend database, such as an "Azure" SQL database, and the stored information may be incorporated into future recommendations which will resonate even more with what a user may want. Furthermore, the stored user information can be clustered based on a neighborhood (or other geographic region) and the clustered information can be used to provide targeted advertisements or specific offerings in the clustered area by studying the choices made by consumers in that pocket, area, or zip code.

For providing the recommendations, the system will use a device knowledge base, e.g., device identity and attribute information collected from product manuals, product inspections, manufacturer inquiries, and the like as well as marketing information, and a level of analytics that is performed on the device knowledge base. In a preferred embodiment, these analytics will employ association rule learning, for example using Apriori (a machine learning modeling technique), to find associations of interest, such as the associations between most bought brands, devices, and/or models, attribute features of devices, and/or the like in the smart home category. The rule learning will help to collect and link associations between devices (e.g., associations as to which devices in similar configurations consumers across the globe use) thereby feeding the recommender with the data that indicates what product(s) to suggest to the user. Data from Web crawlers can also be fed to the association rule learning algorithm as an alternate input to ensure that the recommendation encompasses any new brands, models, and devices/products being released in the market. This information will further strengthen the ability of the recommender to make recommendations that are supremely useful for consumers. Thus, the subject recommender system (which learns from actual customer's preferences and which provides a robust machine learning engine that will adjust and change the recommendations to a customer based on the latest trends learned from the market) will eliminate the need for customers to spend a hefty amount of time researching the statistics about different devices (which most of the time is not from a reliable source) in order to decide what device/model/brand to purchase.

Figure 10:
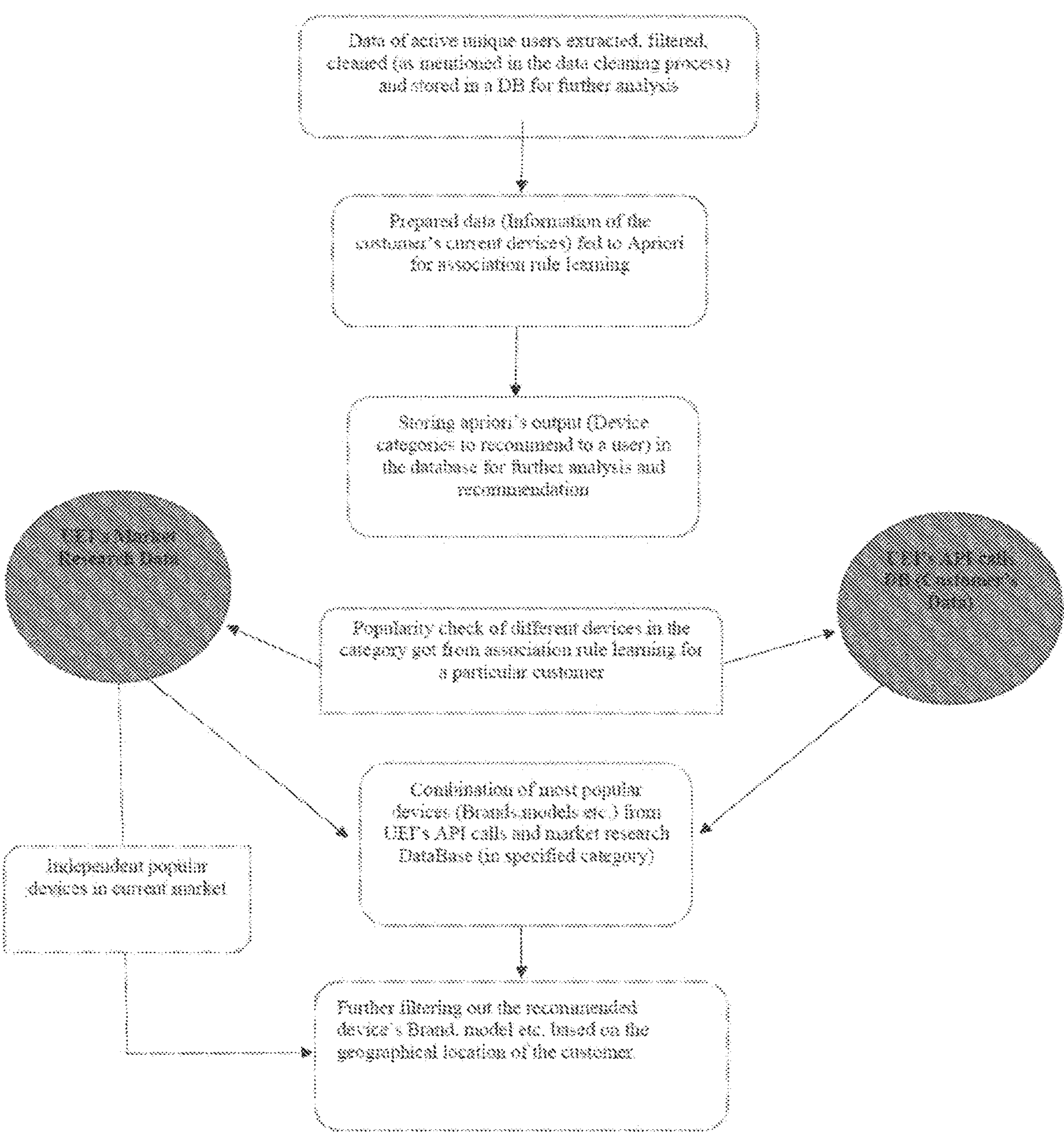
FIG. 10 illustrates an example method for building a recommender engine and an underling recommendation process.
Figure 11:
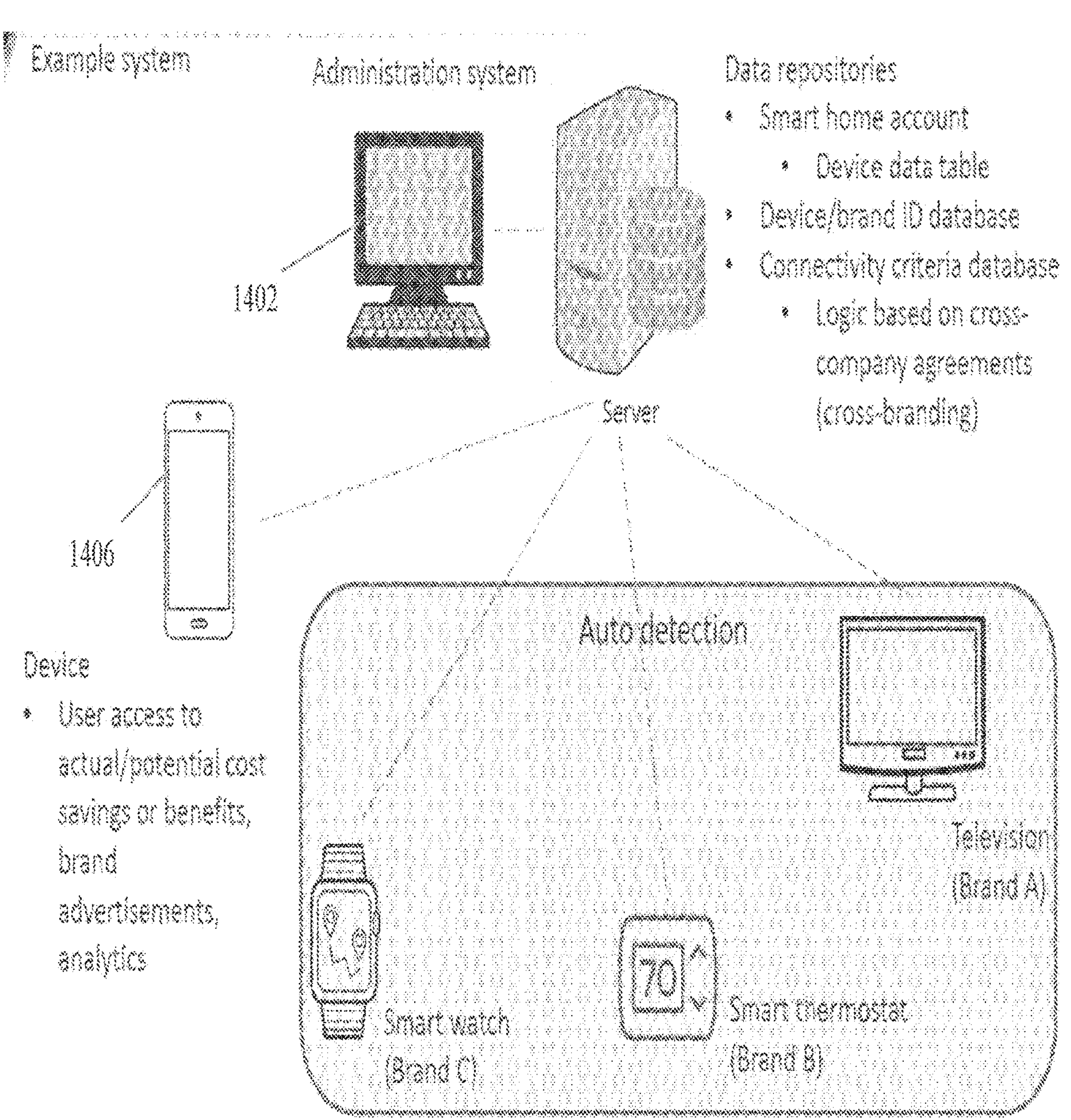
FIGS. 11 through 14 illustrate a system and method for incentivizing users to add more smart devices/products into their home.
Figure 12:
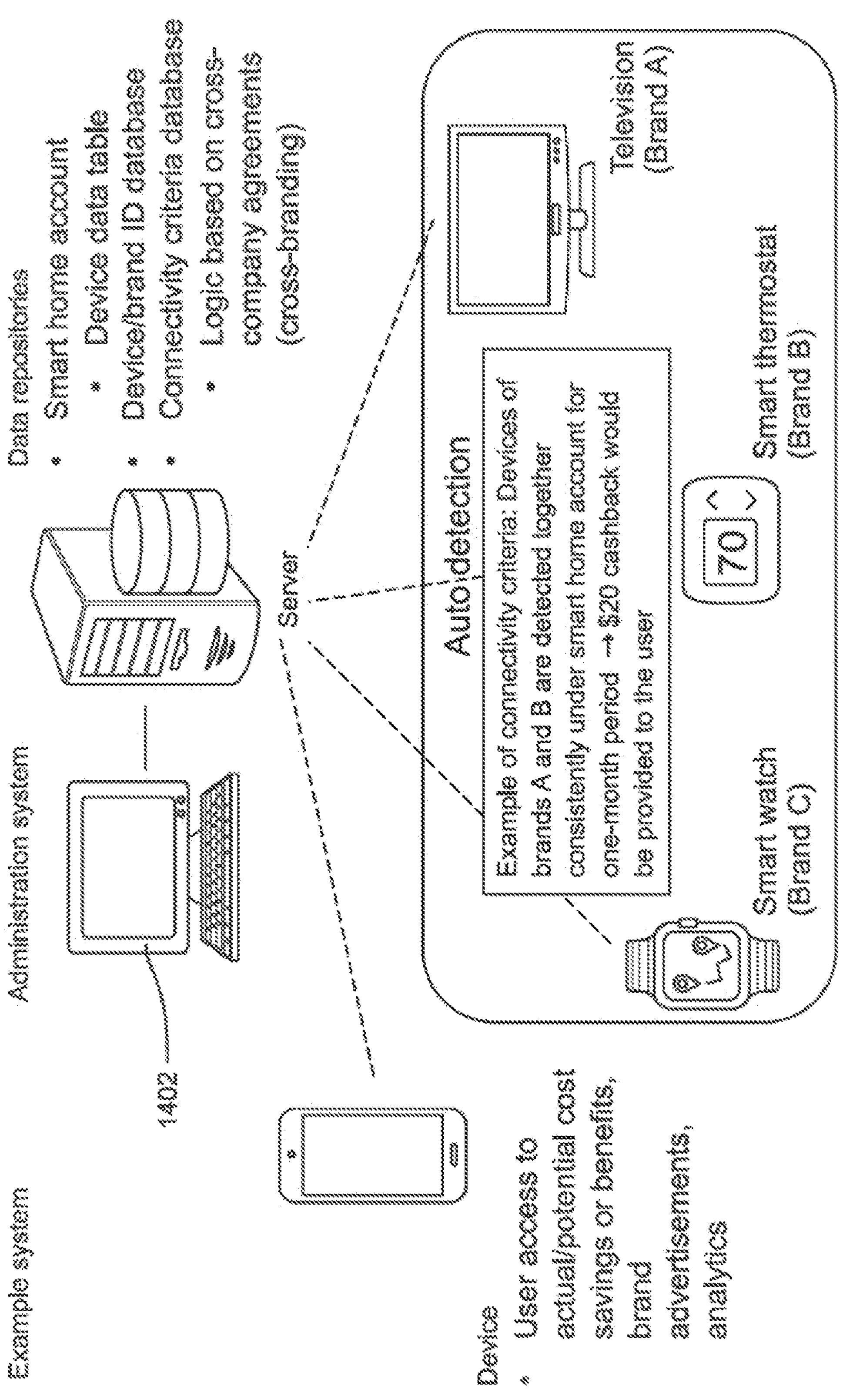

Turning to FIG. 10, an example method for building the recommender engine, particularly the device knowledge base, and the underling process is generally illustrated. Specifically, the objective of this task is to use the information about millions of devices being used by users globally (e.g., brand, device type, subdevice type, model, attributes supported, etc.) to create a recommender system which will function to recommend the most relevant product(s) to the user, especially those products which will enhance the smart home experience of the user, based on the user's current smart home and device (where device can include in addition or alternatively apps) setup information and association rules learned from devices being used by other users with similar device setups, most popular devices from market research, etc. In a preferred example, the data that is used in the association learning formulation of the recommender system is extracted from API calls that are made to a configuration database, e.g., the UEI "QUICK SET" brand remote control configurator database. This data may be extracted using a last active filter (e.g., based on the API call's date) and grouped by distinct users to get the most current information of different devices used by a user/household. In this manner, from the extracted signatures from the API calls to the database, all the different identified device's information (like brand, model, device type etc. from the "QUICK SET" brand predictive module) can be segregated and mapped to the distinct users while unidentified signatures can be compared to information in an additional database and/or Web searched and again mapped to the distinct users. Furthermore, any extracted geo location of the user (e.g., as obtained from the IP address of the household, information requesting device, or the like) may also be mapped to the user's record. The extracted data may then be stored in a database for further analysis as described in greater detail below, e.g., the information of the devices used by a particular user may be formatted (e.g., made into a list of lists) and fed into a desired algorithm for association rules learning.

In combination with the database of user system information created as above, the recommender system will additionally utilize a database having data for most popular devices and the currently popular devices based on geographical locations (which locations can be of any desired size, e.g., neighborhoods, cities, states, countries, etc.). Such a database can be created using well-known market information gathering/research techniques. Preferably, this marketing data is cleaned of any unwanted information and inconsistencies and structured for further analysis such that the data can then be analyzed to see correlations between different features and geographic clustering to get more insights on most popular devices on a region-by-region bases.

As will additionally be appreciated by those of skill in the art, the captured data may be split into training and test sets, for example using scikit learn's train_test_split, for the purpose of validating and tuning the performance of the system. In addition, the support and confidence values associated with the machine learning algorithm may be tweaked until a satisfactory recommendation of devices from the machine learning algorithm is achieved.

In use, the recommender system, including the machine learning algorithm that is particularly adapted for frequent item set mining and association rule learning over relational databases and for identifying the frequent individual items in the database and extending them to larger and larger item sets as long as those item sets appear sufficiently often in the database, is used to learn associations between smart home devices/products (e.g., TV, smart switch, smart plug, smart bulb, smart door lock, sound bar, etc.) and through these learned associations arrive at device(s)/product(s) to recommend to a user based on the user's current setup of devices/products whereupon the recommendations may be presented to the user for consideration by being displayed in a device, spoken by a voice assistant, etc.

It will be further appreciated that the recommender system may be utilized to incentivize users to add more smart devices/products into their home and/or to use more devices/products already incorporated into their system. For example, the system may be adapted to check whether the user is qualified to receive a benefit/reward should the user add a particular device/product to their current system configuration, use an existing device, etc. Furthermore, by use of the aforementioned automatic device/product discovery processes, the system may automatically verify user compliance with the conditions of the offer, e.g., that a product has been purchased and installed and, if needed, the date and time of such installation and continued usage of the product/device. Thus, fulfillment of a connectivity criteria could result in the computation and/or provisions of extra user benefits in accordance with agreements.

By way of further example with reference to FIGS. 11 through 14, by combining auto detection and cross-branding analytical features under the smart home environment, the system can allow users to identify and realize extra cost savings or benefits through a convenient system whereby an administration system 1402, in communication (directly or indirectly) with one or more devices in the user's home having the auto-detection capabilities discussed above (or otherwise adapted to provide their own identity data to an accessible data repository), analyzes data/rules within a connectivity criteria database 1404 to check whether the user is qualified to acquire extra benefits based on the devices/products the system determines are currently (and historically if needed) being used (and/or devices/products that can be used in the system) by the user. In this regard, the connectivity criteria database 1404 represents a multitude of cross-company (cross-branding) business agreements among different smart device manufacturers such that users would be provided with extra benefits when a given connectivity criteria is fulfilled. The connectivity criteria database 1404 could be updated in real-time to reflect extra user benefit opportunities and cross-branding agreements and database maintenance may involve third-party services, such as "Salesforce," as required. Preferably, the system is also adapted such that a user may use a device 1406, such as a smartphone, to access (or be pushed notifications of) actual or potential cost savings/benefits information/offers, brand advertisements (e.g. e-mail notifications, SMS), and analytics that are derived from the connectivity criteria database considering, as needed, the user's current and/or potential system configurations. User benefits may include cashback rewards, coupons, special offers on future purchases of related brand products or services, reward points, and the like without limitation.

Figure 13:
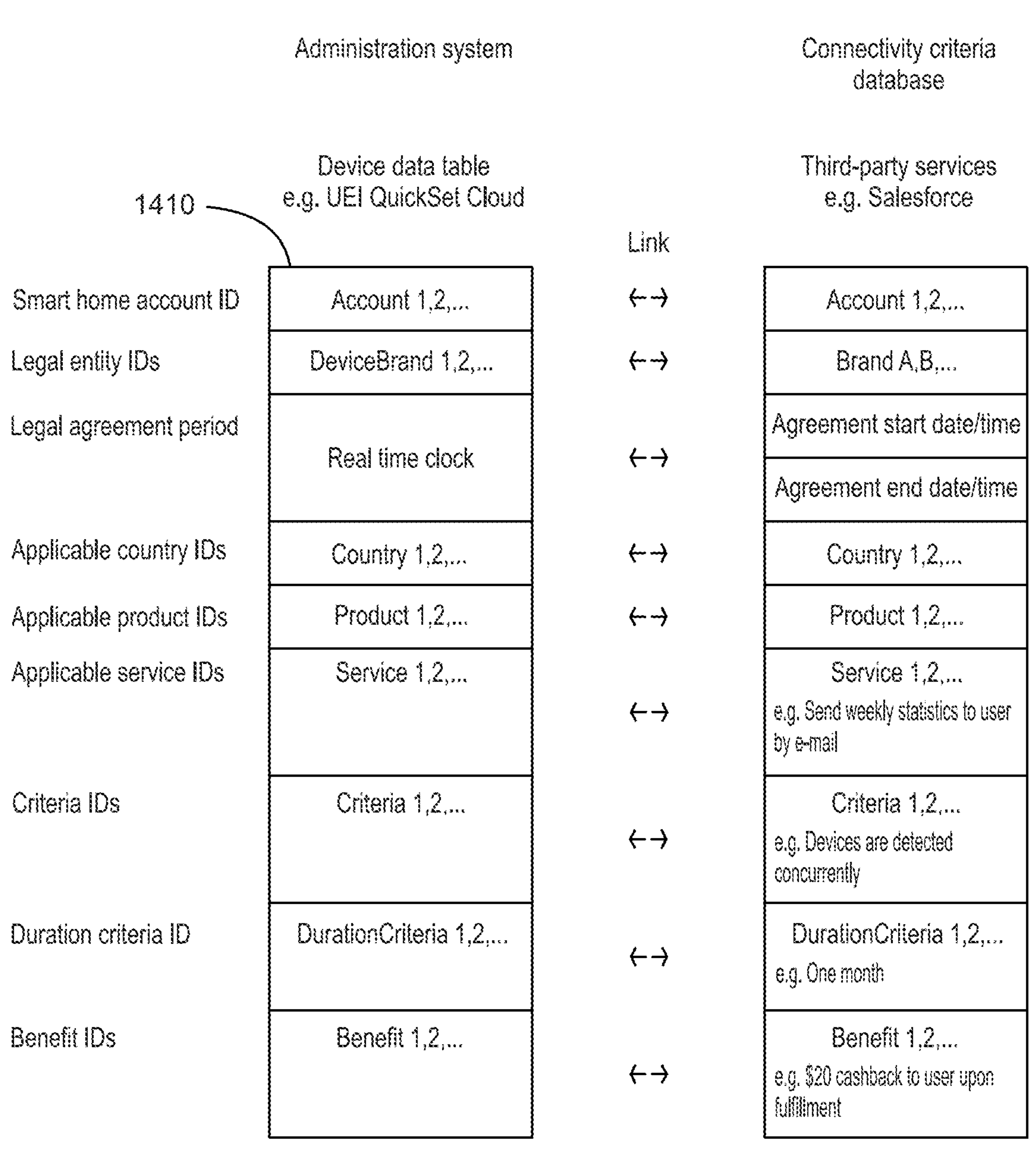
Figure 14:
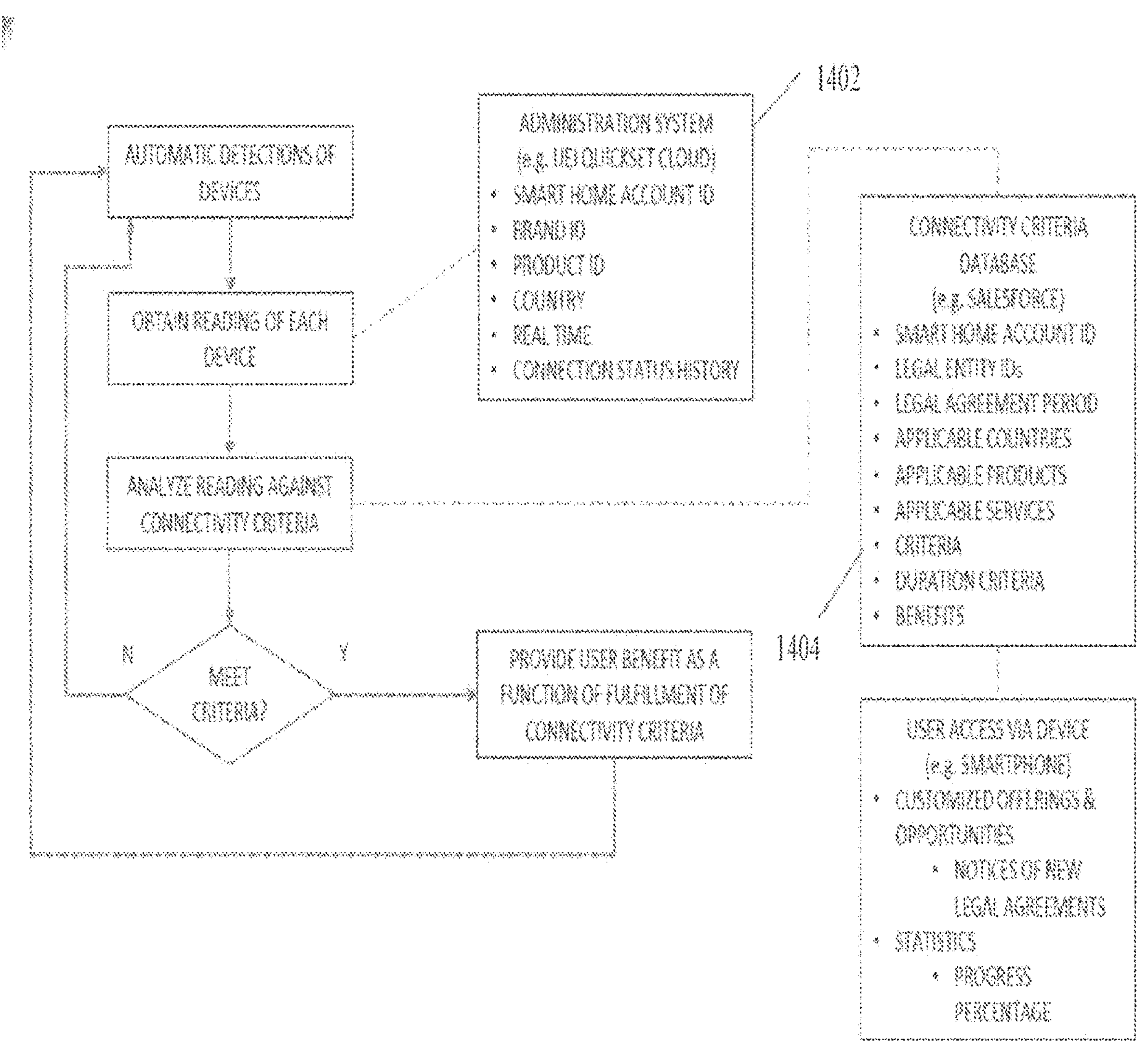

As further illustrated in FIG. 13, the administration of benefits will involve the combined use of the auto detection feature and the connectivity criteria database by the administration system to track the real-time status of connected devices/installed products against the connectivity criteria. To this end, the system will maintain a device data table 1410 which may include device information such as legal entity (e.g., user, home, or the like) IDs, applicable country IDs, applicable product/service IDs, criteria IDs, duration criteria IDs, and benefit IDs for particular home accounts. The device data table 1410 would be utilized to track user/household records and may be analyzed periodically by the administration system against the respective data of connectivity criteria database 1404 to check whether the user is (or possibly can be) qualified to acquire extra benefits. Meanwhile, the connectivity criteria database 1404 (which may be updated as needed by a third party service) represents one or more single company and/or cross-company (cross-branding) business agreements among different smart device manufacturers such that users would be provided with extra benefits when a given connectivity criteria is fulfilled. For example, if the devices of brands A and B are detected together consistently under the smart home account for a one-month period (e.g., after the user with a device brand A within their system was offered a reward to purchase a device brand B, offered a reward to use an already owned device brand B with device brand A, etc.), a $20 cash back would be provided to the user. Accordingly, benefits can be offered for when a user adds a branded device to a system having one or more other device of the same or different brand, uses an existing product of a given brand in a specified manner, and the like as desired without limitation.

In a preferred example, the relational database(s) will not only include data that is indicative of the automatically detected devices and services within the household but will also include data that may be associated with information that a user manually provided to the system (e.g., data indicative of devices and/or services manually identified to the system as a part of a controlling device configuration process). Yet further, the relational database(s) may include data for those devices/services with varying levels of trust/reliability. Still further, the collected data may include data indicative of all interactions with the recommendation and/or configuration services offered by the system, usage of the devices, usage of services supported by the devices, etc. This data, which would be preferably collected regardless of which device is used to provide a service in the case where multiple service enabled devices exist in a single household, would then be merged to provide comprehensive snapshot(s) of the user's household. In addition, the captured and merged data, e.g., the appliance/service identifying data noted above as well as data indicative of content that is being access via use a device, a change in a state for a device/service, a user interaction with a device/service, and the like type of usage/telemetry data as can be or as desired to be captured, may be timestamped so that the system may be informed as to when a device/service was first seen, last seen, used, etc., for use in connection with at least the various purposes described herein.

It will also be appreciated that the above described, comprehensive collection of data will also allow the system to be trained in a manner that will particularly improve the prediction, compliance checking, etc. capabilities of the system as the system is able to reprocess/update the household profiles upon repeated usage of the various data collection processes. Thus, it will be further appreciated that this data would be well suited to train models (or in some cases simple rules) for data expansion to add to household profile data in place, e.g., models for use in deriving brand preferences in a household, household categories (such as gamers and streamers), predicting likely churn candidates, deriving time of use, etc. Similarly, such data would be well suited to train models for runtime predictions, e.g., models for predicting patterns such as first action taken in the afternoon (entertainment or smart home) on their TV, basic thermostat temp setting, purchase intention (what would/could they buy next?), etc.

It will be further understood that the recommender system may also be utilized to come up with new hypothesis and reports considering models trained to discern habits and trends. Likewise, the recommender system may be used to train models that are intended to personalize the experience of a household no matter through what device a third party service may be accessed. To this end, the system may function to merge a household view across enabled devices, independent of the devices explicitly being linked together, whereupon the experience of the household on other third party services may be personalized based on derived household profiles that can be retrieved for the household by any such 3rd party services.

While it is contemplated that the system may analyze usage data on the recommender (or device setup/configuration) services to obtain insight into the household, e.g., by monitoring API calls to a device configuration service, such as UEI's "QUICKSET" brand service, by monitoring API calls to a streamer service to determine what media is being accessed/watched, by capturing data such as when a TV is turned on and when it was first installed, etc., in a preferred example any such data will not, if provided to a service outside of the household, contain user identifiable data. To this end, such data may be abstracted as required to avoid violating privacy laws or may otherwise be maintained on and be accessible only by devices within a secure local area network. In this use case, it will also be appreciated that any services, such as the above-described recommender services, any device configuration services, etc., may be performed locally where the required "comparison" data is also locally maintained and, to the extent any cloud services are required to be used, any data that is provided to such services is again abstracted to avoid the dissemination of any user identifiable data. Thus, a household profile may exist in the cloud in an abstracted manner and/or may also reside on a device such that the information remains within the user's network as a decentralized system and each device within the user's network may share data within the home network (e.g., acting as a smart edge device) for synchronizing the profile across all of the local area network connected devices.

When data is stored in the relational database, a household identifier, such as an IP address, may be used to cross-reference appliance and/or usage data to a given household. It may, however, be desirable to use an alternative identifier as it is recognized that IP addresses can change over time. Thus, it some instances, a service identifier, such as a device ID for a device supporting a configuration service, can be used once a profile is in place to remap new public IPs to an existing household as they evolve/change on an ongoing basis. Furthermore, because public IPs correlated to user recognizable data may also provide a security concern, in some instances such data may be kept private through use of hashing schemes that never have access to originals, key vaults limiting personal access to data outside of runtime environments, etc.

In view of the foregoing, it will be appreciated that the described recommender service has, among other advantages, the advantage of providing a real-time view of what different types of households are currently doing (or not doing) in specific timeframes, e.g., what devices/products are installed in a user's home network and how the installed devices/products are being used. Accordingly, it will also be appreciated that this real-time view can be used to provide targeted advertising via the use of retargeting tags, e.g., derived data that is used to select advertising that is to be presented to a user. For example, when a user accesses a particular website, cloud service, or the like that supports advertising, through retargeting tags, the system can map a household to certain attributes and automatically adjust the advertising within (or advertising to be added to) the content that is being accessed based on the household profile, e.g., the system can tag the household to a "PlayStation" brand gaming household that has a 6 year old "Sony" brand TV and a household that is therefore likely to buy a new TV, and more likely to buy a "Sony" brand TV such that the advertising in the website or cloud service is adjusted to present an advertisement for at least a "Sony" branded TV. As noted above, this advertising service may be performed locally to ensure compliance with privacy laws and, to this end, may require a plurality of advertisements to be prestored in a local device for selection of a desired advertisement based on a locally determined retargeting tag.

In a further example, when the system tags a household as using a particular brand or service the system can promote different and compatible devices as desired. To this end, when a user visits a support/help website and/or interacts with a virtual agent on any device, the system will be provided with information about what devices and/or services a user has at home and what the user could be looking for, e.g., the knowledge could be gleaned from a user asking to setup/troubleshoot an issue with a particular device and/or service. In such an instance, the system can use the gleaned knowledge to contact a third party provider whereupon the third party provider can target the user for an offer, benefit, etc. Thus, the system can be used to proactively send notices to pay-tv operators on possibility of churn in a household, so they can offer new incentives before a churn occurs, target a push notification to user of a specific model/brand and year of TV that has a specific new security flaw that needs to be corrected, and the like without limitation.

By way of still further example, the system can repeatedly use a device discovery process to automatically determine a configuration of a home network system of the user, e.g., the devices installed on the network and/or the services that are installed on the devices. The repeatedly determined configuration of the home network system of the user can then be examined by the machine learning algorithm(s), using historical data captured from other households, to determine if a change in the system has occurred and to determine if the detected system change is indicative of the user being likely to drop a service that is being accessed via the home network system of the user, i.e., that the user is likely to churn. Such a change can be a detected disconnection of a STB in favor of a streaming device, the simple addition of a streaming device to the user's home network, the installation of a particular service on a streaming device, etc. as determined via use of the noted machine learning processes. As before, when the system determines that a user is likely to churn, the system can cause an appropriate notification to be sent to the service provider.

As noted above, when suggested replacement or add-on products (which may include apps and/or services) have been identified, these products, apps, and or services may be called to the attention of a retailer whereupon the information can be used by the retailer to directly market to the consumer. In this manner, retailers, such as smart device manufacturers and service providers, can utilize the generated information to, among other things, increase market penetration in the smart home environment.

By way of further example, a retailer, a manufacturer, or the like (referred to herein simply as a "retailer"), such as a retailer of smart TVs, might want to specifically identify opportunities to increase penetration into living rooms of users. In such case, the smart TV retailer could register one or more target business opportunities (e.g. requesting an opportunity to target users with no smart TVs in living rooms) in a connectivity opportunity database associated with the recommender system. Thus, using the auto detection and location-aware features discussed about and a reverse-marketing approach, the subject systems would allow smart device retailers to conveniently receive notifications or reverse advertisements from the system when their target business opportunities have been identified.

More particularly, it is contemplated that the described systems could be utilized to provide a reverse advertisement capability. For example, the system can use device, app, owner, and the like information obtained as described above to identify an exploitable household or room configuration of a home network system of the user to a business entity/third party. The previously described device discovery process could be used to automatically determine a room, home theater, or other location or interconnectability identifiable configuration of a home network system of the user and the determined grouping of devices and/or configuration of the devices of the user would be used to automatically verify a compliance by the opportunity settings of a business entity with a condition for receiving the reverse advertisement. The reverse advertisement would be provided to the business entity when the determined room and/or household, and/or home theater, and/or other identifiable configuration of the home network system of the user is determined to be in compliance with the condition for receiving the reverse advertisement.

It will also be appreciated that, by leveraging the ability of the system to support voice commands, the voice commands can be used to discern device, apps, and location information and associations as desired. For example, in a scenario where a user requests a specific voice enabled platform to "turn on the lights in the living room" or "lock the backdoor" an association between a location within a home, a controllable device, and a voice enabled platform (and/or app) can be established. Thus, to provide smart device retailers with increased opportunities, the subject system could be adapted to combine the use of auto detection and location-aware features to define the room/position (e.g. living room, backdoor, home entertainment center) of each connected smart device based on the application of Natural Language Understanding (NLU) feature.

Figure 15:
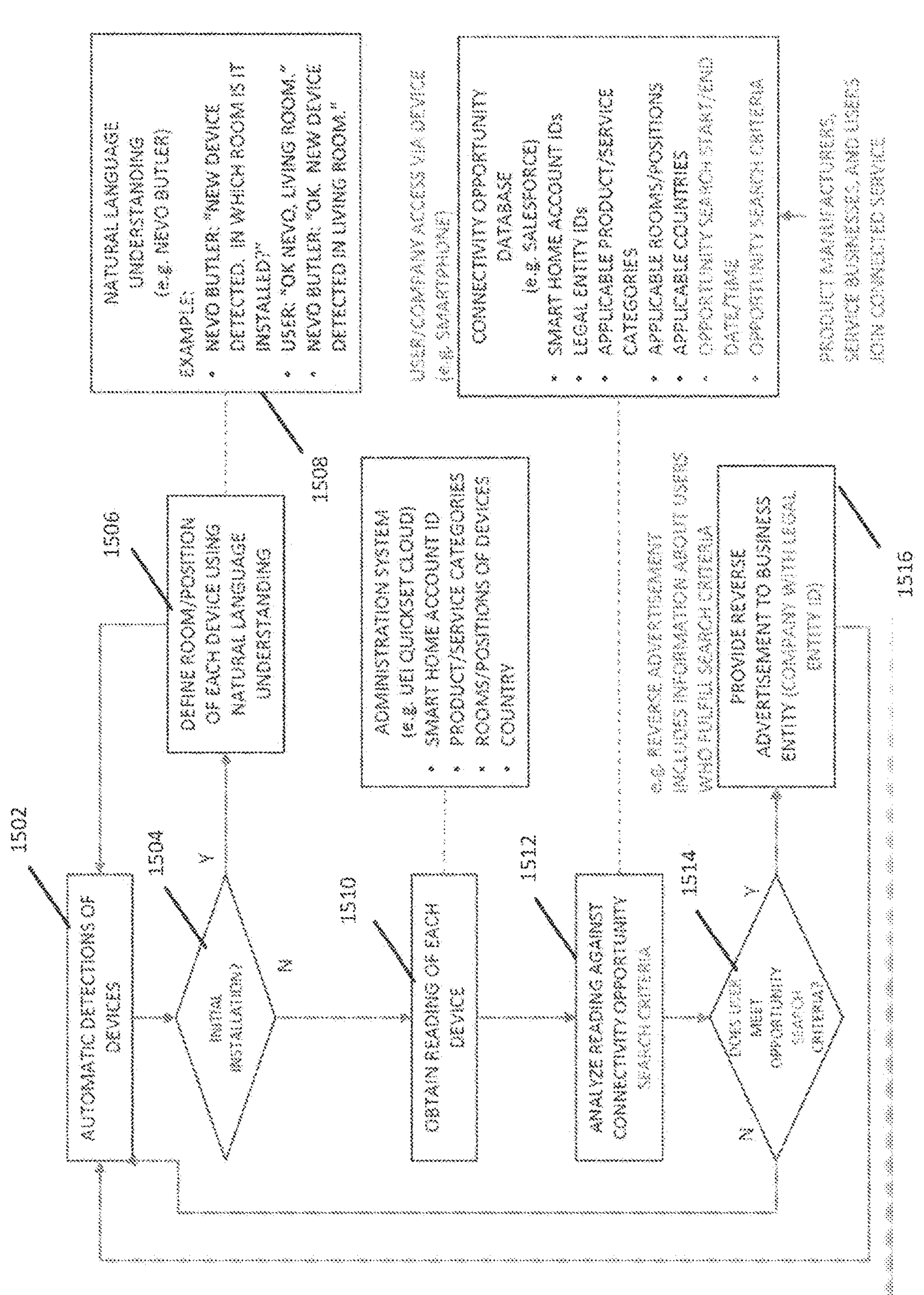
FIG. 15 illustrates a method for identifying reverse advertisement.

Turning to FIG. 15, to provide such reverse advertising, the system may be utilized to periodically monitor the equipment in the home of a user 1502. When the system determines that a new piece of equipment is present in the user's home system 1504, for example when the system auto detects installation of a new smart or IoT device as described above, the system can automatically control a smart speaker (e.g. a "Nevo Butler" brand digital voice assistant) to request that the user specify to the smart speaker the room/position of the newly connected device 1506. The user will then provide a voice response to the smart speaker to specify the room/position of the connected device 1508. It is to be appreciated that other location determination methods could also be utilized for this same purpose. Examples of further methods for determining an absolute or relative location of a controlled device and/or the absolute or relative location of a controlling smart device (from which the location of a controlled device can be inferred) can be found in U.S. Pat. No. 8,180,37, the disclosure of which is incorporated herein by reference in its entirety. Captured device identifying information cross-referenced to location identifying information is then stored in a relational database.

When the process illustrated in FIG. 15 is caused to be executed, the system may additionally poll the devices to determine if one or more devices have been removed from the household or have been relocated within the household. The information collected during this step will likewise be stored in and/or used to update the information stored in the relational database.

When determining if a reverse advertising opportunity exists for a retailer, the system will access device information 1510, e.g., from the devices directly and/or from the administration database, and the collected information will be compared against the conditions for various retailer opportunities 1512 defined in the connectivity opportunity database. The connectivity opportunity database represents a multitude of smart device retailers' target business opportunities based on users' household room configurations such that smart device retailers would be provided with reverse advertisements when an opportunity condition for receiving the reverse advertisement is identified.

As noted, the system may maintain a device data table which may include information such as legal entity IDs, applicable product category IDs, applicable room/position IDs, and applicable country IDs for the purpose of business-opportunity searches by smart device retailers. The administration system may then track the status of rooms/positions of the users' connected smart devices against the connectivity opportunity database. In addition, retailers may be provided with access to users' home network system configuration information and related analytics to thereby allow the retailers to review such information for possibly defining still further opportunities. The user's home network system configuration information may be abstracted when accessed by third parties to thereby ensure privacy of a given user or a user may be required to opt-in to this feature.

When the conditions of an opportunity are determined to be met by the system 1514, e.g., if smart TVs are not detected in the users' living rooms, the administration system could send automatic notifications or reverse advertisements 1516 to one or more smart TV retailers about exploitable opportunities that exist in the living rooms of specified users. By utilizing the opportunity information on the users' household room settings, administration system could send notifications or reverse advertisements to one or more smart device retailers, which in turn would allow these smart device retailers to send targeted advertisements to potential buyers who already possess a connected smart home system. The contact with a buyer by a retailer could be direct or it may be required to be through the system administrator to provide some degree of separation between system users and retailers. In some instances, the system can facilitate the providing of advertising to a user via use of their connected smart device.

In sum, by utilizing the powerful device discovery features of the subject systems, the described systems may allow smart device retailers to at least semi-automate routine marketing and sales processes to identify target business opportunities (e.g. target users who already possess a connected smart home system but not the smart devices on sale), set the product selling price, send targeted advertisements to these target users, and arrange online purchases by these target users.

To facilitate the automation of the marketing and sales processes, the system will leverage the application of artificial intelligence (e.g. machine learning) and rule-based expert systems whereby some basic marketing and sales expertise are captured in a collection of rules that are implemented under the connected service environment through the collective intelligence of an administration system and smart device manufacturers. These rules and learning processes may take into consideration the users' unique configurations in their home network systems, users' online behaviors, market conditions, and smart device manufacturers' motivations to maximize sales. Periodic data curation by the system administrator and automatic implementation of a Frequent Pattern Growth Algorithm by the administration system is preferably utilized with the rules and learning processes to highlight specific business opportunities for smart device manufacturers. An association rule learning principle is also preferably utilized to discover strong relations among the variables stored in the databases (e.g., relations among general device/service category IDs such as Television, Smart thermostat, and Smart bulb). Via use of these techniques and processes, auto-detected devices/services in the users' household configurations may be captured by the administration system as a collection of device/product category IDs and service category IDs that could be linked to existing knowledge graphs and the auto-detected device/service dataset may then be curated in accordance with the predefined settings of basic key parameters of association rule learning principle such as minimum support threshold, support, confidence, and lift.

It will also be appreciated by those of skill in the art that system administrators could manually adjust the key parameters and apply data curation and/or that the data-curation process itself could be automated by tracking and optimizing these key parameters such that the total number of new auto detections is maximized in the system. Furthermore, it is to be understood that using an Association Rule Learning principle, Frequent Pattern Growth Algorithm to automatically discover frequent patterns/combinations of specified device/service category IDs provides a time and cost improvement as compared to using a conventional Apriori Algorithm for this same purpose.

Figure 16:
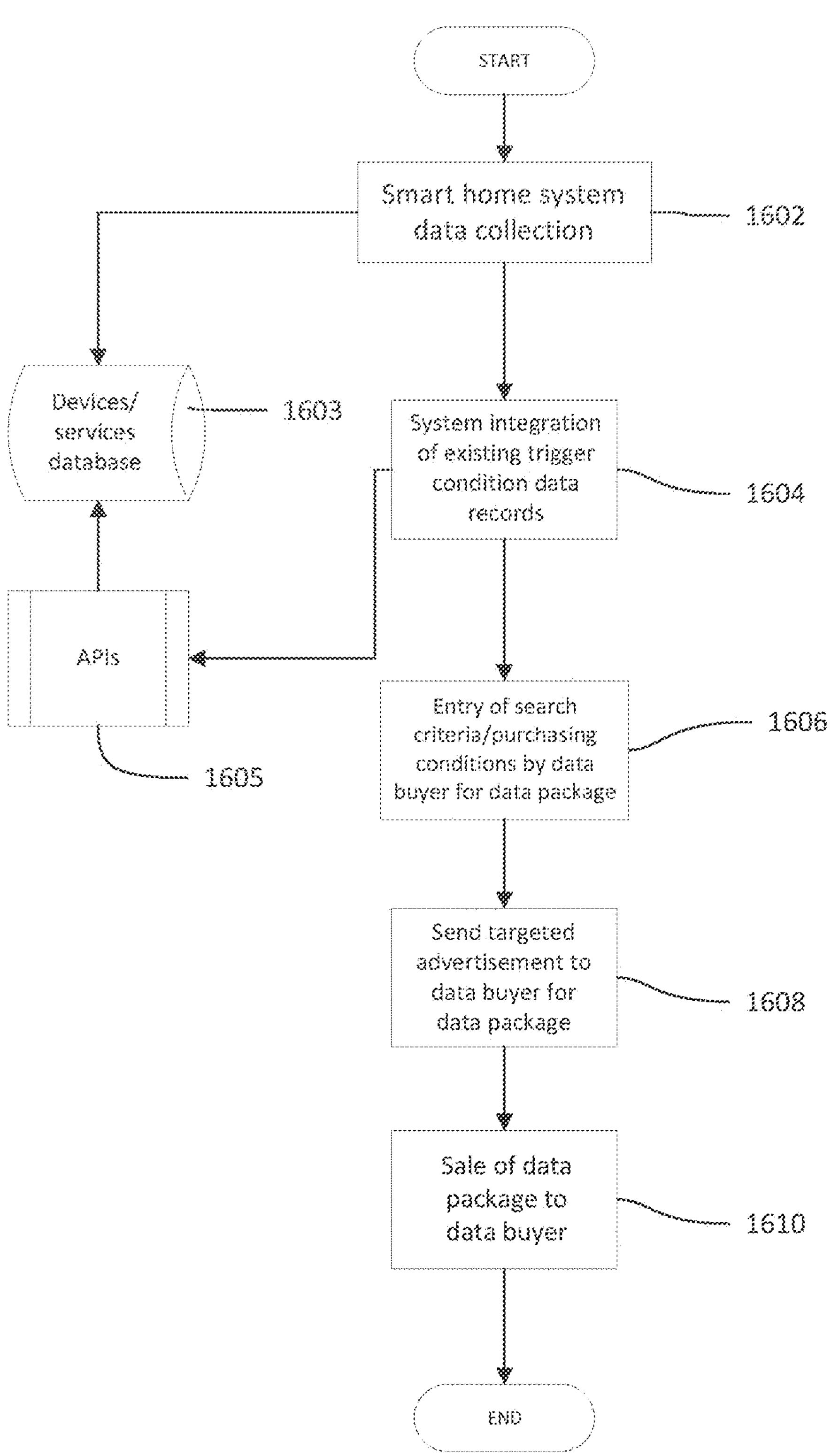
FIG. 16 illustrates an example method for targeted advertisements.

Turning to FIG. 16, example systems and methods for providing targeted advertisement to data buyers are disclosed. In particular, in one example, to provide a system and method for supplying data packages involving various targeted advertisement records of business entities, the example system may be utilized to mine data records based on the periodic monitoring of the equipment and digital communications in the home of a user. As disclosed herein, the example systems and methods may provide for a streamlined system among data buyers, the administration system 1402 and device/service sellers for data monetization.

For instance, as a first step 1602, data from smart home ecosystem is collected by the administration system 1402 and stored in a device/services database 1603. At a step 1604, after data records related to targeted advertisements by various business entities are collected by the administration system 1402 and stored in the devices/services database 1603, the administration system 1402 may integrate and utilize any number of APIs 1605 to filter and/or utilize existing records of various pre-determined criteria/conditions that may also trigger the administration system 1402 to send one or more reverse advertisements to one or more other relevant business entities, thereby further enriching the data records for data buyers. By way of example, data buyers may enter search criteria and data-purchasing conditions in connected systems 1606 such that they automatically receive targeted advertisement 1608 from the administration system 1402 in real time, or as close to real time as possible, when their search criteria and data purchase conditions for applicable digital data records are fulfilled.

By way of example, data buyer D intends to purchase digital data package involving records of targeted advertisements by various business entities for smart thermostats to household users in Seattle during February and March. Related data records are captured and stored in the devices/services database 1603 and includes data records from the timing at which initial targeted advertisement is received through the timing at which the newly purchased smart thermostat is automatically detected in the home.

From a data monetization process under the connected smart home environment, at step 1606 data buyers enter their search criteria for data search, such as for instance in the same way as market segmentation, and similarly enter their conditions for data purchase. In the search criteria for data purchases, the data buyers have additional criteria to select archived or new digital data records from the devices/services database 1603 as well as specific data-collection periods and/or marketing phase.

In this example, B2B targeted advertisements are sent out from the administration system 1402 to data buyers at step 1608 when the search criteria and data-purchase conditions (step 1606) for applicable data records are fulfilled. At step 1610, household user data packages are sold individually (e.g. per target household) to data buyers in real time upon fulfillment of search criteria and data-purchase conditions. This digital data package may include and is not limited to target household general profile (e.g., use data is respected), home network system configuration before/after purchase of advertised device/service, advertised device/service, digital data of other smart devices and sensors in the home, and target household's online records (e.g., time stamps, number of view/clicks, etc.) during the applicable marketing phase.

In still other examples, it will be appreciated that recent trends suggest that the impact of Web3, which is an extension of cryptocurrency, using blockchain in new ways to new ends, on business activities will continue to grow. Based on its core functionality to provide user control over personal data, blockchain technology supports dynamic data tracking and usability. In the present example, there is a demonstrated need for business entities to reach out to household users efficiently and effectively to generate revenue in the digital age. With the present invention of a connected smart home, availability of B2B2C targeted advertising services that can exploit various data records from digital-wallet systems may allow for the business entities to seek and generate more sales revenue. At the same time, it will be noted that certain business entities, such as home security service providers, are more reliant on time-sensitive insights such as the specific timing at which a household user purchases a new home using a digital wallet. In other words, the present disclosure provides for exploitable business opportunities from multiple systems and methods as more relevant data records are captured and utilized in real time or as close to real time as possible. In short, various programs, called "smart contracts," are utilized on blockchain transactions and automatically executed when pre-defined contract criteria in the program are fulfilled. Thus, these programs can be triggered to be relevant to B2B2C targeted advertising services and then utilized to provide household users with timely access to useful targeted advertisements under the present connected smart home environment.

In one example of the present invention, the smart contracts program includes algorithms with pre-defined set of criteria/actions, or actionable knowledge base, in the digital-wallet system transactions of household users such that fulfillment of a pre-determined contract criteria represents early discovery of exploitable business opportunities. If a household user purchases a new home, for instance, this record represents a real-time business opportunity for home security service providers. Consequently, as one scenario example, smart contract can be pre-defined as an actionable knowledge base such that if household user purchases a new home with a digital wallet, reverse advertisements would be automatically sent out to home security service providers A and B to initiate B2B2C targeted advertising process.

In this way, in a monetization initiative under the connected smart home environment, digital data records can be exploited at an earlier timing of a marketing phase and on a much broader scale. In other words, it becomes possible to discover exploitable business opportunities and arrange B2B2C targeted advertising services. Blockchain technology, its properties, and related tracking/verification algorithms are utilized to allow household users to selectively disclose personal data while receiving useful and relevant targeted advertisements.

The example invention for the present blockchain initiative involves dynamic application of digital-wallet system data whereby digital-wallet system data records of household users are linked to the administration system 1402 and then continuously analyzed against a general smart contract—actionable knowledge base—to extract exploitable business opportunities that emerge in real time for business entities when pre-defined criteria are fulfilled.

In the example systems and methods, algorithms for the actionable knowledge base are continuously accumulated in connectivity pre-opportunity database and directly embedded in the transactions/records of household users as smart contracts. When pre-defined criteria of a smart contract are fulfilled, the administration system 1402 checks the user's home network system configuration to verify system conformance and then initiates B2B2C targeted advertising process to relevant business entities in accordance with smart contract conditions.

Finally, while a smart contract typically allows automated program execution of agreed conditions between related parties when pre-defined contract criteria are fulfilled, smart contract itself functions as an actionable knowledge base that provides earlier discoveries of exploitable business opportunities when pre-defined set of criteria in the knowledge base is fulfilled.

It is contemplated that the methods described above could also be utilized in the metaverse, which is a virtual 3D world in which various users and business entities could immerse themselves deeply to carry out a wide range of social and business activities via an avatar, or virtual identity. In this regard, the metaverse is characterized by high levels of visual representations and user interactions that help to create an immersive virtual environment for dynamic transactions among buyers and sellers under the digital platform environment. For example, within the metaverse a "Meta-Real" mansion may include a real-world physical home and a virtual counterpart in the metaverse where the virtual property would exactly mirror the real property. In such an instance, virtual stores within the metaverse could provide a feeling of realism by mimicking physical stores, thereby allowing users from different locations through different devices to browse virtually and then purchase products, services, and/or data for the real world.

More particularly, to address the emerging need to develop distinct monetization capabilities and business-process advantages in a highly competitive metaverse marketing environment and to empower buyers and sellers to effectively carry out real-time transactions that are linked to the real-world smart home ecosystem, i.e., to provide systems and methods for targeted advertisements of various products/services/data based on real-time data synchronization between administration system and metaverse environment, it is desired to conceptualize B2C/B2B/C2C/B2B2C targeted advertising services in a metaverse environment underpinned by blockchain technology. By establishing real-time data links in this manner between administration systems and metaverse environments for the real-world and virtual user accounts, users could carry over their home network system configuration data into a virtual environment from where they could share this specific data with other users and/or business entities based on consent and then engage in various related B2C/B2B/C2C/B2B2C transactions in a metaverse mode (e.g., virtual reality, mixed reality, augmented reality, or the like) using a virtual identity. This real-time data synchronization between administration system and metaverse environment for the transaction processes allows users to conveniently process relevant marketing information in metaverse mode that could further enrich their real-world connected smart home environment.

In one example, B2C/B2B/C2C/B2B2C transactions could be widely carried out among buyers and sellers in a virtual smart home model environment that is automatically or manually furnished with 3D/2D visual/video representations of already owned and/or newly browsed connected devices/services in accordance with the applicable user's home network system configuration data and online browsing history. In addition, data from individual avatar's activities, actions, and integrated environment (e.g. location/position/timing/means whereby the target avatars viewed the targeted advertisement as 3D/2D/video to make transactions) in metaverse mode may yield additional insights on psychographics, and user behaviors, and real-time data associations, thereby allowing sellers to further enhance the quality, and coverage, and impact of connectivity-based market opportunity search and arrange relevant marketing activities for exploitable business opportunities.

Specifically, when users operate in metaverse mode as avatars, their home network system configuration data that are carried over from the real world and their recorded data from engaging in B2C/B2B/C2C/B2B2C transaction processes in the virtual world are continuously synchronized in real time between administration system and metaverse environment. Based on this systemic arrangement of real-time data synchronization, sellers in the virtual environment could initially obtain or confirm consent from other searchable/interactable avatars as required to read their home network system configuration data individually, carry out a connectivity-based market opportunity search in metaverse mode, and thereafter provide target avatars with relevant targeted advertisements as 3D/2D visual/video representations that are preferably displayed in the same virtual environment. B2C/B2B/C2C/B2B2C transactions among sellers and target avatars in the virtual environment could then be captured and tracked based on real-time synchronized data records of offer and acceptance events. An offer event occurs in the virtual environment when sellers send targeted advertisements to one or more target avatars. An acceptance event occurs in the virtual environment when the target avatar agrees to purchase the advertised product/service/data for use in the real-world home. Real-time data records from these offer and acceptance events in metaverse mode may include avatar IDs (sellers, target avatars), advertised product/service/data IDs, virtual store IDs, timestamps, home network system configuration of each applicable user, selling price, discount amount, etc.

Figure 17:
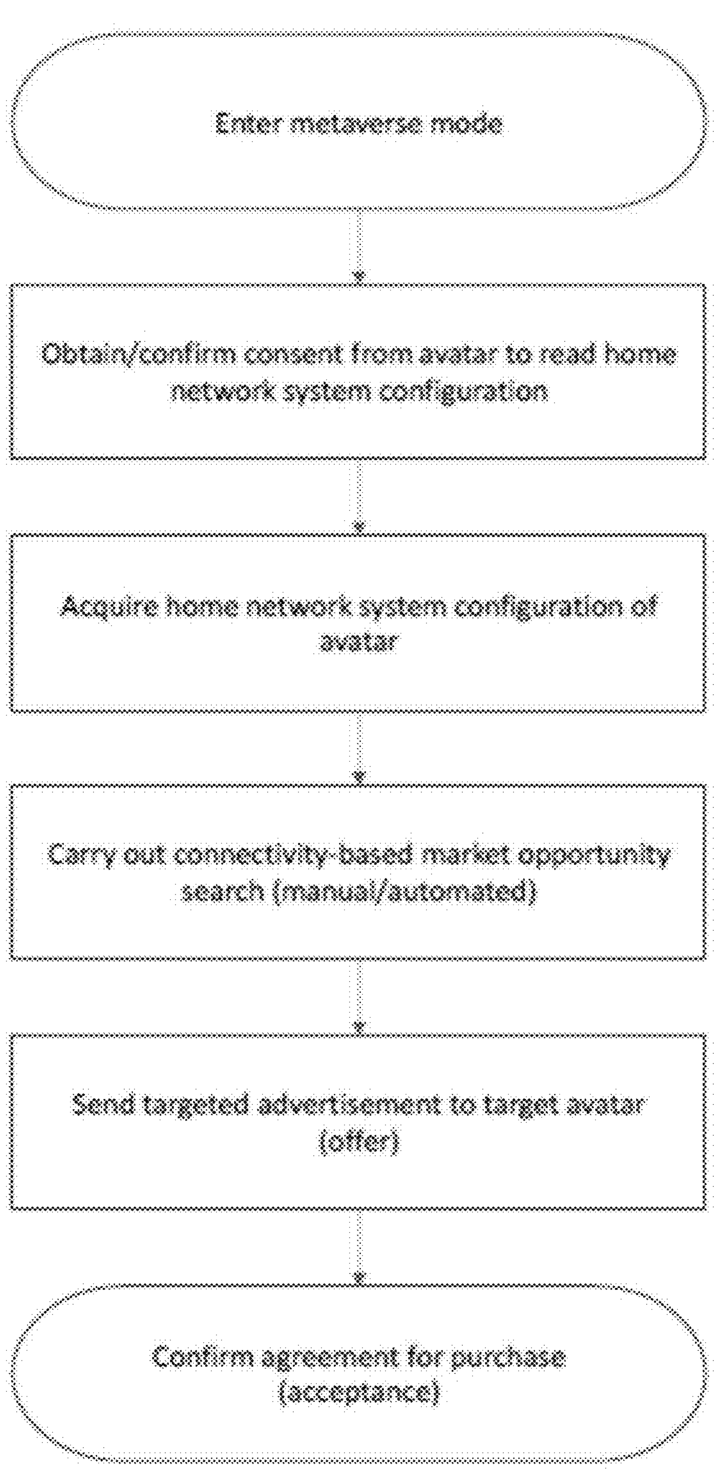
FIG. 17 illustrates an example method for facilitating shopping in the metaverse.

Within this synchronized environment of a user and his/her virtual identity, it is contemplated that an administration system will, as shown in FIG. 17, confirm user consent, obtain data that reflects a real home network system configuration of a user, flow the home network system configuration data to the users' virtual environment, obtain data the that reflects avatar activities and actions by the user in the metaverse, use the configuration data and/or the avatar activity/environment data to provide connectivity-based market opportunity search features for manual and/or automated application by sellers in the metaverse and/or the real world, and control the flow of B2C/B2B/C2C/B2B2C targeted advertisements from sellers to the user to facilitate shopping within the metaverse and/or the real world based on real-time data synchronization with the administration system. As will be appreciated, this continuously generated data will be cross-referenced to a user specific data within a database managed by the administration system.

While various concepts have been described in detail, it will be appreciated by those skilled in the art that various modifications and alternatives to those concepts could be developed in light of the overall teachings of the disclosure. For example, while the user interface portion of the illustrative product recommendation system and method described takes the form of a smart device app, it will be appreciated that other embodiments are possible, for example in the form of a PC or Web tablet application, either locally resident or server-based. Additionally, while the databases used for storing setup and configuration information, command code sets, and product feature/function reference may for simplicity be illustrated herein as co-located on a single Web server, it will be appreciated that individual data sets may be located across a multiplicity of servers as long as all are accessible to the product recommendation application. Accordingly, it will be appreciated that the method described herein could be implemented in general as computer-executable software associated with one or more network servers, i.e., a hardware platform, with the software being stored on a computer-readable media embodied in a physical device such as a hard disk drive, memory card, and the like.

Further, while described in the context of functional modules and illustrated using flowcharts and/or block diagrams, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the disclosure. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the disclosure set forth in the claims without undue experimentation. It will be additionally appreciated that the particular concepts disclosed are meant to be illustrative only and not limiting as to the scope of the disclosure which is to be given the full breadth of the appended claims and any equivalents thereof.

All patents and patent applications cited within this document are hereby incorporated by reference in their entirety.

What is claimed is:

1. A method for providing advertising, comprising:

extracting, by a monitoring application, signatures from application programming interface (API) calls sent from a remote control application resident on at least one controlling device within a real-world home network system of a user to an external, remote control configuration application that provides to the remote control application data for configuring the remote control application;

using the signatures extracted from the API calls to update a relational database in which is stored installed device information for the real-world home network system of the user, the installed device information being cross-referenced to an identifier for the at least one controlling device and indicating a configuration of the real-world home network system of the user;

using the installed device information for the real-world, home network system of the user stored in the relational database to create a virtual-world, home network system of the user;

using data obtained from a one or more activities of an avatar of the user with the virtual-world, home network system of the user that results in a change in a configuration of the virtual-world, home network system of the user to identify an advertisement to provide to the user; and causing the advertisement to be provided to the user within the virtual-world and/or the real-world.

2. A non-transitory, computer readable media having stored thereon instructions executable by a processor to cause a device to perform steps for providing advertising, the steps comprising:

extracting signatures from application programming interface (API) calls sent from a remote control application resident on at least one controlling device within a real-world home network system of a user to an external, remote control configuration application that provides to the remote control application data for configuring the remote control application;

using the signatures extracted from the API calls to update a relational database in which is stored installed device information for the real-world home network system of the user, the installed device information being cross-referenced to an identifier for the at least one controlling device and indicating a configuration of the real-world home network system of the user;

using the installed device information for the real-world, home network system of the user stored in the relational database to create a virtual-world, home network system of the user;

using data obtained from a one or more activities of an avatar of the user with the virtual-world, home network system of the user that results in a change in a configuration of the virtual-world, home network system of the user to identify an advertisement to provide to the user; and causing the advertisement to be provided to the user within the virtual-world and/or the real-world.

* * * * *